(12) United States Patent
Crowley et al.

(10) Patent No.: US 11,799,636 B2
(45) Date of Patent: *Oct. 24, 2023

(54) METHOD, APPARATUS, AND COMPUTER PROGRAM PRODUCT FOR ENCRYPTION KEY MANAGEMENT WITHIN A GROUP-BASED COMMUNICATION SYSTEM

(71) Applicant: Salesforce, Inc., San Francisco, CA (US)

(72) Inventors: Richard Crowley, San Francisco, CA (US); Audrei Drummond, Brooklyn, NY (US); Jessica Fain, Berkeley, CA (US); Leah Jones, San Francisco, CA (US); Ilan Frank, Los Altos Hills, CA (US); Nikolas Kinkel, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 17/109,671

(22) Filed: Dec. 2, 2020

(65) Prior Publication Data

US 2021/0091933 A1 Mar. 25, 2021

Related U.S. Application Data

(63) Continuation of application No. 16/989,452, filed on Aug. 10, 2020, which is a continuation of application
(Continued)

(51) Int. Cl.
*H04L 9/08* (2006.01)
*H04L 9/06* (2006.01)

(52) U.S. Cl.
CPC .......... *H04L 9/0833* (2013.01); *H04L 9/0618* (2013.01); *H04L 9/0861* (2013.01); *H04L 9/0891* (2013.01)

(58) Field of Classification Search
CPC ... H04L 9/0833; H04L 9/0618; H04L 9/0861; H04L 9/0891; H04L 9/083; H04L 9/0894; H04L 9/14; H04L 9/321
See application file for complete search history.

(56) References Cited

U.S. PATENT DOCUMENTS 6,718,361 B1 4/2004 Basani et al.
7,546,465 B2 6/2009 Kent, Jr. et al.
(Continued)

FOREIGN PATENT DOCUMENTS

JP H09252294 A 9/1997
JP 2001333099 A 11/2001
(Continued)

OTHER PUBLICATIONS

Japanese Patent Application No. 2019-225306, Office Action with English translation, dated Mar. 23, 2021.
(Continued)

*Primary Examiner* — Beemnet W Dada
(74) *Attorney, Agent, or Firm* — Lee & Hayes, P.C.

(57) ABSTRACT

Various embodiments are directed to systems and methods for encryption key management within a group-based communication platform.

20 Claims, 35 Drawing Sheets

Related U.S. Application Data

No. 16/434,097, filed on Jun. 6, 2019, now Pat. No. 10,778,419.

(60) Provisional application No. 62/681,578, filed on Jun. 6, 2018.

(56) References Cited

U.S. PATENT DOCUMENTS

| | | | |
|---|---|---|---|
| 9,100,355 | B2 | 8/2015 | Tomkow |
| 9,380,523 | B1 | 6/2016 | Mijar et al. |
| 9,940,394 | B1 | 4/2018 | Grant et al. |
| 2012/0084286 | A1 | 4/2012 | Hubner et al. |
| 2016/0275303 | A1 | 9/2016 | Narayanaswamy et al. |
| 2016/0359684 | A1 | 12/2016 | Rizqi et al. |
| 2018/0048464 | A1* | 2/2018 | Lim ............ H04L 9/0894 |
| 2018/0197144 | A1 | 7/2018 | Frank et al. |
| 2018/0287982 | A1 | 10/2018 | Draeger et al. |

FOREIGN PATENT DOCUMENTS

| | | |
|---|---|---|
| JP | 2002111659 A | 4/2002 |
| JP | 2008148132 A | 6/2008 |
| JP | 2015049542 A | 3/2015 |
| WO | 2014204862 A1 | 12/2014 |
| WO | 2017040334 A1 | 3/2017 |
| WO | WO2019236905 A1 | 12/2019 |

OTHER PUBLICATIONS

European Application No. 19734545.7, Examination Report dated Apr. 7, 2021.
European Office Action dated Apr. 7, 2021 for European Patent Application No. 19734545.7, a counterpart foreign application of the U.S. Appl. No. 16/434,097, 5 pages.
Japanese Office Action dated May 26, 2021 for Japanese Patent Application No. 2020-556889, a counterpart foreign application of the U.S. Pat. No. 10,778,419, 12 pages.
"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications—", Fujitsu Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
Canadian Office Action dated Jul. 20, 2021 for Canadian Patent Application No. 3093718, a foreign counterpart to U.S. Pat. No. 10,778,419, 5 pages.
EP Application No. 19213366.8 European Search Report dated Mar. 19, 2020.
WIPO Application No. PCT/US2019/035870, International Search Report and Written Opinion of the International Searching Authority, dated Sep. 20, 2019.
Canadian Office Action dated Feb. 16, 2022 for Canadian Application No. 3,093,718, a foreign counterpart to U.S. Pat. No. 10,778,419, 7 pages.
Japanese Office Action dated Sep. 28, 2021 for Japanese Patent Application No. 2020-556889, a foreign counterpart to U.S. Pat. No. 10,778,419, 9 pages.
Extended Eurpoean Search Report dated Jul. 7, 2022 for European Patent Application 22167254.6 a foreign counterpart to U.S. Pat. No. 10,778,419 5 pages.
Office Action for U.S. Appl. No. 16/989,452, dated Nov. 28, 2022, Crowley, "Method, Apparatus, and Computer Program Product for Encryption Key Management Within a Group-Based Communication System", 7 pages.
Korean Office Action dated Sep. 15, 2022 for Korean Patent Application No. 10-2020-7038065, a foreign counterpart to U.S. Pat. No. 10,778,419, 10 pages.

* cited by examiner

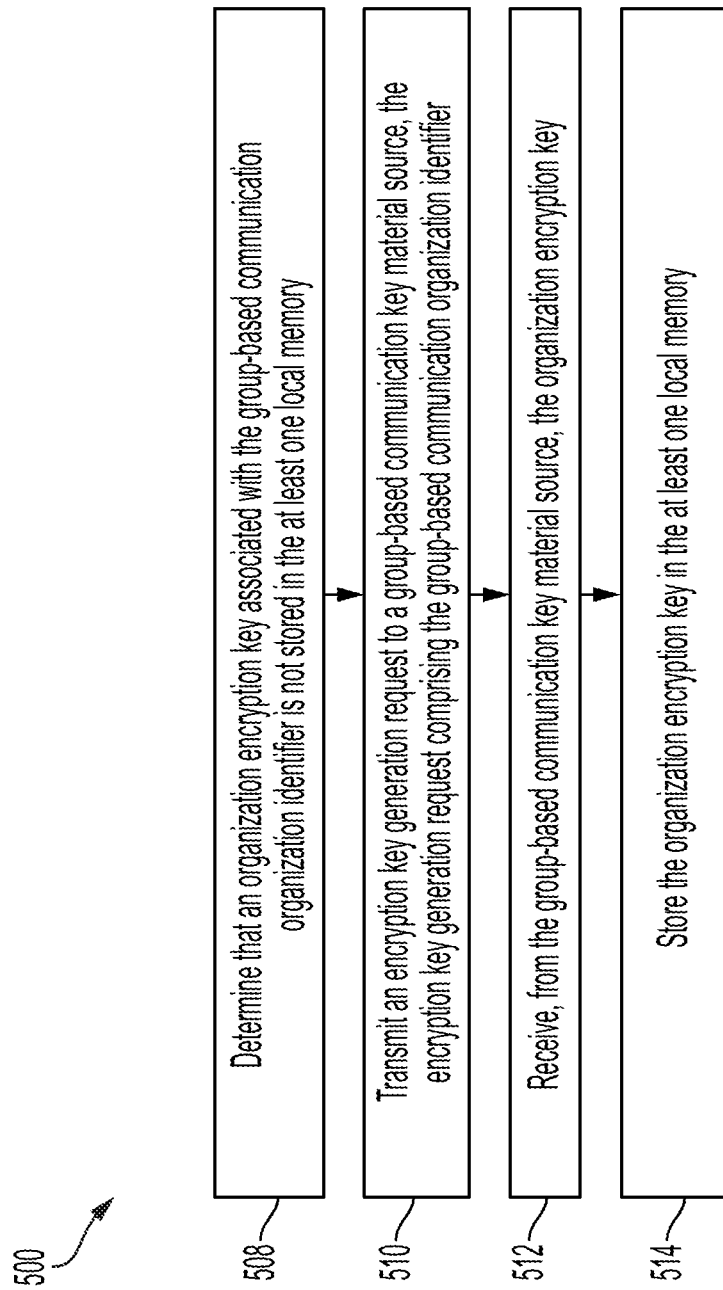

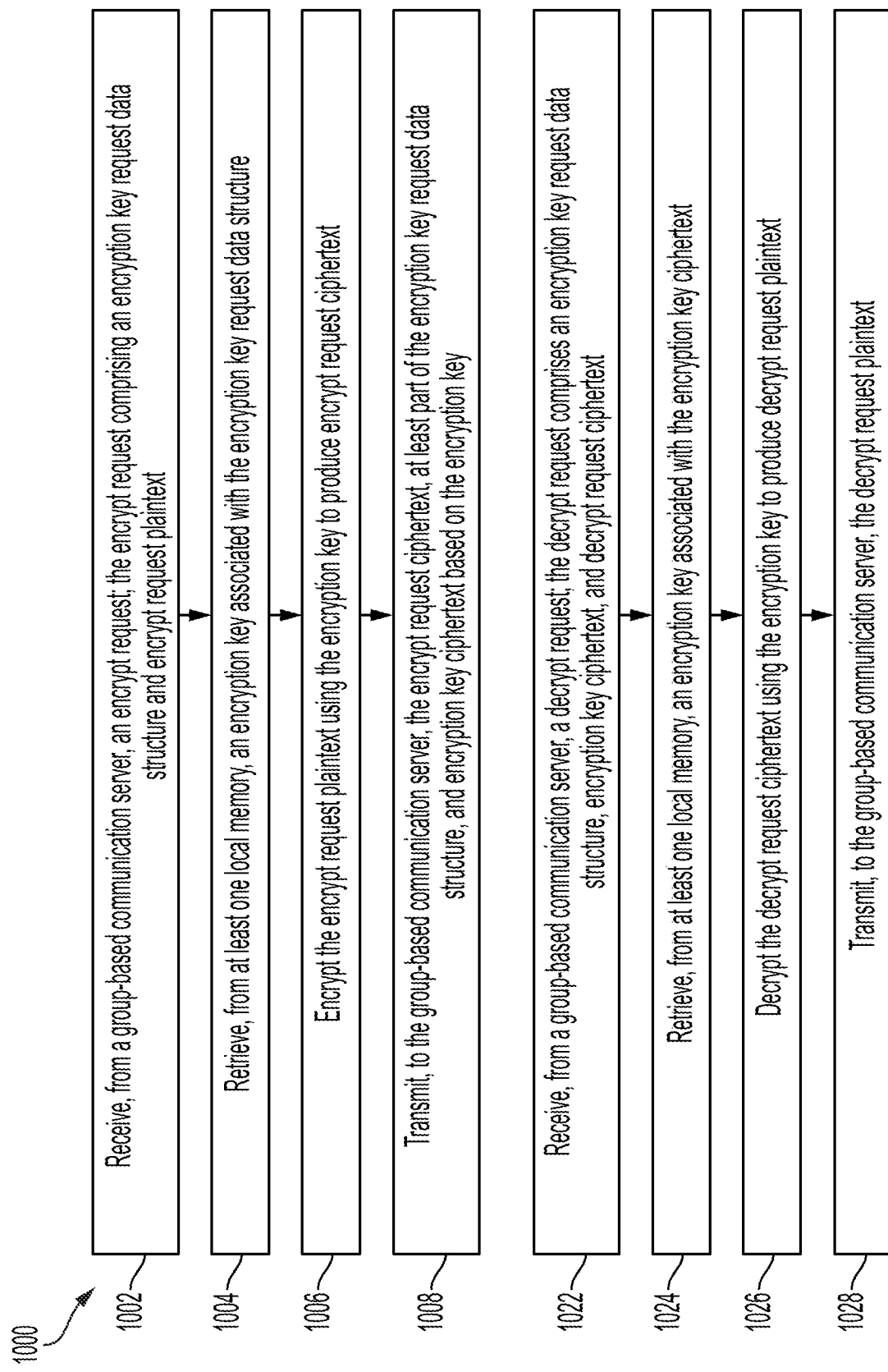

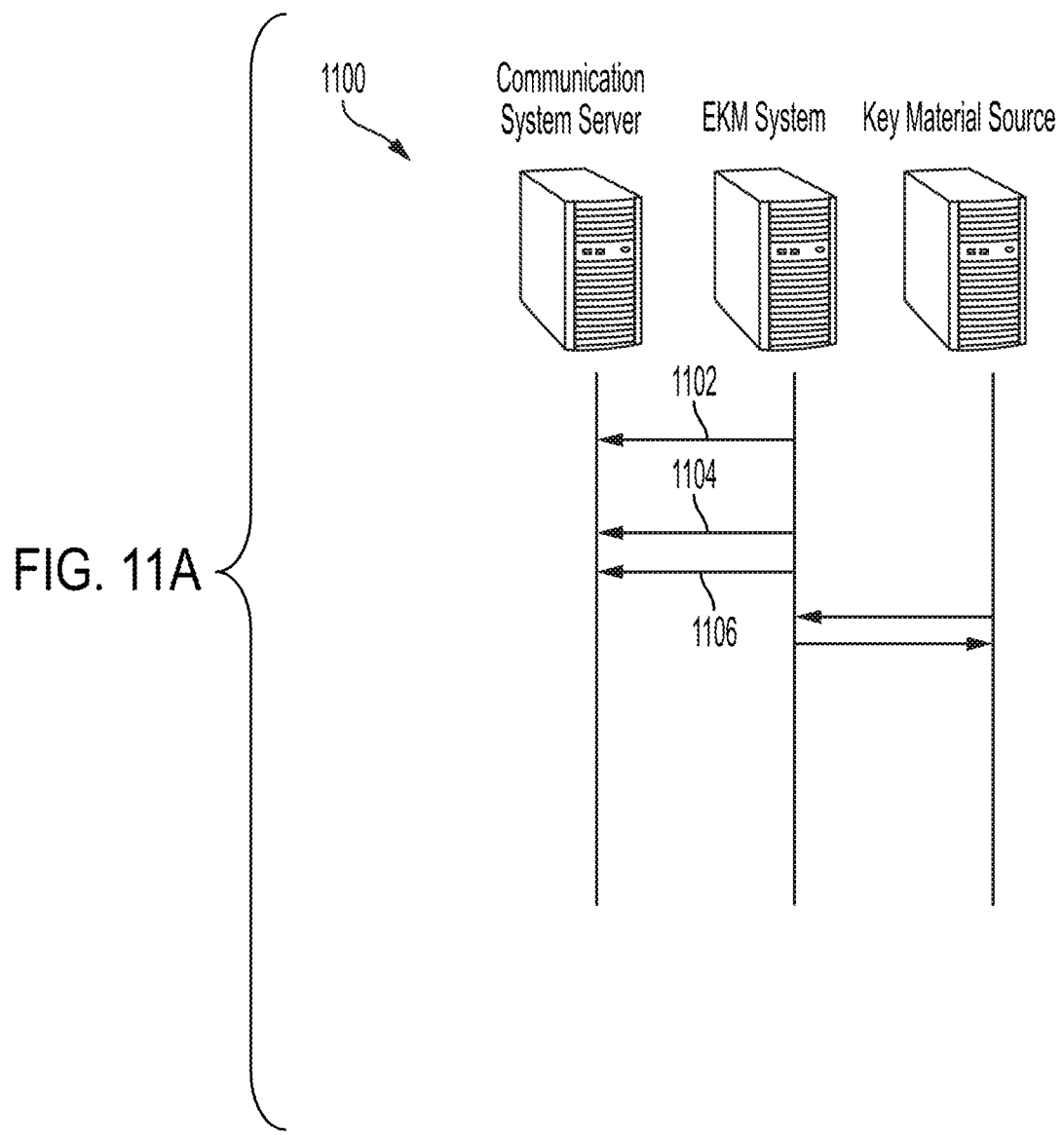

METHOD, APPARATUS, AND COMPUTER PROGRAM PRODUCT FOR ENCRYPTION KEY MANAGEMENT WITHIN A GROUP-BASED COMMUNICATION SYSTEM

CROSS-REFERENCE TO RELATED APPLICATIONS

This patent application is a continuation application claiming priority benefit, with regard to all common subject matter, of U.S. patent application Ser. No. 16/989,452, filed Aug. 10, 2020, and entitled "METHOD, APPARATUS, AND COMPUTER PROGRAM PRODUCT FOR ENCRYPTION KEY MANAGEMENT WITHIN A GROUP-BASED COMMUNICATION SYSTEM ("the '452 Application"). The '452 Application is a continuation application claiming priority benefit, with regard to all common subject matter, of U.S. patent application Ser. No. 16/434,097, filed Jun. 6, 2019, now U.S. Pat. No. 10,778,419, issued Sep. 15, 2020, and entitled "METHOD, APPARATUS, AND COMPUTER PROGRAM PRODUCT FOR ENCRYPTION KEY MANAGEMENT WITHIN A GROUP-BASED COMMUNICATION SYSTEM" ("the '419 Patent"). The '419 Patent claims priority benefit, with regard to all common subject matter, of earlier-filed U.S. Provisional Patent Application No. 62/681,578, filed Jun. 6, 2018, and entitled "METHOD, APPARATUS, AND COMPUTER PROGRAM PRODUCT FOR ENCRYPTION KEY MANAGEMENT WITHIN A GROUP-BASED COMMUNICATION SYSTEM." The identified earlier-filed patent and patent applications are hereby incorporated by reference in their entirety into the present application.

BACKGROUND

Systems have been provided for supporting communication and collaboration among a plurality of client devices and for storage of records associated with the communication. Applicant has identified a number of deficiencies and problems associated with control of the data security within such communication and collaboration tools. Through applied effort, ingenuity, and innovation, many of these identified problems have been solved by developing solutions that are included in embodiments of the present invention, many examples of which are described in detail herein.

BRIEF SUMMARY

This specification relates to encryption key management within a group-based communication system.

In embodiments, an apparatus for providing encryption key management within a group-based communication system comprises at least one process and at least one non-transitory memory storing instructions that, when executed by the processor, configure the apparatus to provide encryption key management.

In embodiments, the apparatus is configured to receive, from a group-based communication server, an encrypt request, the encrypt request comprising an encryption key request data structure and encrypt request plaintext.

In embodiments, the apparatus is configured to retrieve, from at least one local memory, an encryption key associated with the encryption key request data structure.

In embodiments, the apparatus is configured to encrypt the encrypt request plaintext using the encryption key to produce encrypt request ciphertext In embodiments, the apparatus is configured to transmit, to the group-based communication server, the encrypt request ciphertext, at least part of the encryption key request data structure, and encryption key ciphertext based on the encryption key.

In embodiments, the apparatus is configured to, upon determining that an encryption key associated with the encryption key request data structure is not stored in the at least one local memory, transmit an encryption key generation request to a key material source, the encryption key generation request comprising the encryption key request data structure.

In embodiments, the apparatus is configured to, upon determining that the key material source has not responded with one or more of the encryption key or encryption key ciphertext, transmit an encrypt request error to the group-based communication server.

In embodiments, the encryption key request data structure comprises a plurality of unique keyscope components. In embodiments, access to encryption keys associated with one or more of the unique keyscope components is revoked.

In embodiments, the apparatus is configured to receive, from the key material source, the encryption key and encryption key ciphertext associated with the encryption key.

In embodiments, the apparatus is configured to store the encryption key and encryption key ciphertext associated with the encryption key in the at least one local memory.

In embodiments, the apparatus is configured to receive, from a group-based communication server, a decrypt request, the decrypt request comprising an encryption key request data structure, encryption key ciphertext, and decrypt request ciphertext.

In embodiments, the apparatus is configured to retrieve, from at least one local memory, an encryption key associated with the encryption key ciphertext.

In embodiments, the apparatus is configured to decrypt the decrypt request ciphertext using the encryption key to produce decrypt request plaintext.

In embodiments, the apparatus is configured to transmit, to the group-based communication server, the decrypt request plaintext.

In embodiments, the apparatus is configured to, upon determining that an encryption key associated with the encryption key ciphertext is not stored in the at least one local memory, transmit an encryption key generation request to a key material source, the encryption key generation request comprising the encryption key request data structure and the encryption key ciphertext.

In embodiments, the apparatus is configured to, upon determining that the key material source has not responded with the encryption key, transmit a decrypt request error to the group-based communication server.

In embodiments, the encryption key request data structure comprises a plurality of unique keyscope components. In embodiments, access to encryption keys associated with one or more of the unique keyscope components is revoked.

In embodiments, the apparatus is configured to receive, from the key material source, the encryption key and store the encryption key and encryption key ciphertext associated with the encryption key in the at least one local memory.

In embodiments, the apparatus is configured to, upon determining that an encryption key associated with the encryption key request data structure is not stored in the at least one local memory, transmit an encryption key generation request to a key material source, the encryption key generation request comprising the encryption key request data structure.

In embodiments, the apparatus is configured to receive, from the key material source, the encryption key and encryption key ciphertext associated with the encryption key.

In embodiments, the apparatus is configured to store the encryption key and encryption key ciphertext associated with the encryption key in the at least one local memory.

In embodiments, the apparatus is configured to, upon determining that the key material source has not responded with one or more of the encryption key and encryption key ciphertext, transmit an encrypt request error to the group-based communication server.

In embodiments, the encryption key request data structure comprises a plurality of unique keyscope components.

In embodiments, access to encryption keys associated with one or more of the unique keyscope components is revoked.

In embodiments, the apparatus is configured to, upon determining that an encryption key associated with the encryption key ciphertext is not stored in the at least one local memory, transmit an encryption key generation request to a key material source, the encryption key generation request comprising the encryption key request data structure and the encryption key ciphertext.

In embodiments, the apparatus is configured to receive, from the key material source, the encryption key and store the encryption key and encryption key ciphertext associated with the encryption key in the at least one local memory.

In embodiments, the apparatus is configured to, upon determining that the key material source has not responded with the encryption key, transmit a decrypt request error to the group-based communication server.

In embodiments, the encryption key request data structure comprises a plurality of unique keyscope components.

In embodiments, access to encryption keys associated with one or more of the unique keyscope components is revoked.

In embodiments, the group-based communication server transmits to a client device channel history placeholder text for rendering within a group-based communication channel interface in a client device display.

In embodiments, the encrypt request plaintext comprises one of group-based communication message plaintext, group-based communication file plaintext or a group-based communication search index encryption key.

In embodiments, the decrypt request ciphertext comprises one of group-based communication message ciphertext or group-based communication file ciphertext.

In embodiments, the decrypt request ciphertext comprises an encrypted group-based communication search index encryption key.

In embodiments, the decrypt request ciphertext comprises an encrypted group-based communication search index encryption key and the group-based communication server transmits to a client device search results omitting a search result associated with the decrypt request ciphertext.

In embodiments, an apparatus for providing encryption key management is capable of communicating with one or more servers of a communication system, and comprises at least one processor and at least one non-transitory memory storing instructions that, when executed by the processor, configure the apparatus to provide encryption key management.

In embodiments, the apparatus is configured to provide, to the one or more servers, access to one or more encryption keys provided by a key material source, the encryption keys for accessing data managed by the communication system.

In embodiments, access to encryption keys is revocable on a per keyscope component basis, wherein a keyscope component is associated with an encryption key and is one of a timestamp, a user identifier, a message identifier, a file identifier, group-based communication channel identifier, a group-based communication team identifier, a group-based communication workspace identifier.

In embodiments, the apparatus is further configured to provide, to the one or more servers, access to one or more encryption keys stored in at least one local memory, the encryption keys for accessing data managed by the communication system.

In embodiments, the apparatus is further configured to provide encrypted plaintext or decrypted ciphertext to the one or more servers, using the one or more encryption keys provided by the key material source.

In embodiments, the plaintext comprises one or more of group-based communication message plaintext, group-based communication file plaintext, or a group-based communication search index encryption key.

In embodiments, the decrypted ciphertext comprises one or more of decrypted group-based communication message ciphertext, decrypted group-based communication file ciphertext, or a decrypted group-based communication search index encryption key.

In embodiments, an apparatus for providing encrypted group-based communication messages to a group-based communication server comprises at least one processor and at least one non-transitory memory storing instructions that, when executed by the processor, configure the apparatus to provide encrypted group-based communication messages to a group-based communication server.

In embodiments, the apparatus is configured to receive, from the group-based communication server, a group-based communication message encrypt request, the group-based communication message encrypt request comprising a group-based communication key family identifier, a group-based communication message keyscope component set, and group-based communication message plaintext.

In embodiments, the apparatus is configured to retrieve, from at least one local memory, a group-based communication message encryption key associated with the group-based communication message keyscope component set and group-based communication key family identifier.

In embodiments, the apparatus is configured to encrypt the group-based communication message plaintext using the group-based communication message encryption key to produce a group-based communication message ciphertext.

In embodiments, the apparatus is configured to transmit, to the group-based communication server, the group-based communication message ciphertext, the group-based communication message keyscope component set, and encryption key ciphertext associated with the group-based communication message encryption key. In embodiments, the group-based communication server stores the group-based communication message ciphertext, the group-based communication message keyscope component set, and the encryption key ciphertext associated with the group-based communication message encryption key in a group-based communication repository.

In embodiments, the apparatus is configured to, upon determining that a group-based communication message encryption key associated with the group-based communication keyscope component set and group-based communication key family identifier is not stored in the at least one local memory, transmit an encryption key generation request to a group-based communication key material source, the encryption key generation request comprising the group-based communication keyscope component set and the group-based communication key family identifier.

In embodiments, the apparatus is configured to receive, from the group-based communication key material source, the group-based communication message encryption key and encryption key ciphertext associated with the group-based communication message encryption key.

In embodiments, the apparatus is configured to store the group-based communication message encryption key and encryption key ciphertext associated with the encryption key in the at least one local memory.

In embodiments, a group-based communication message keyscope component set comprises a plurality of group-based communication keyscope components, wherein a group-based communication keyscope component is one of a group-based communication organization identifier, a group-based communication workspace identifier, a group-based communication channel identifier, or a timestamp.

In embodiments, the apparatus is configured to, upon expiration of an encryption key management cache persistence period after the timestamp, remove, from the at least one memory, the group-based communication message encryption key and encryption key ciphertext associated with the group-based communication message encryption key.

In embodiments, each group-based communication message is associated with a unique group-based communication message keyscope component set.

In embodiments, the group-based communication organization identifier identifies a group-based communication organization with which a group-based communication message sender identifier is associated, the group-based communication message sender identifier associated with the group-based communication message.

In embodiments, the group-based communication workspace identifier identifies a group-based communication workspace with which the group-based communication message sender identifier and group-based communication message are associated, and wherein the group-based communication channel identifier identifies a group-based communication channel with which the group-based communication message sender identifier and group-based communication message are associated.

In embodiments, the timestamp identifies a network time at which the group-based communication message was electronically transmitted by a client device to the group-based communication server.

In embodiments, the apparatus is configured to generate an access log data structure based on the group-based communication message encrypt request, wherein the access log data structure comprises the group-based communication message keyscope component set and a request reason code.

In embodiments, the apparatus is configured to store, in the at least one memory, the access log data structure.

In embodiments, the group-based communication message encrypt request is generated as a result of a transmission by a client device of a group-based communication message to the group-based communication server.

In embodiments, the group-based communication server extracts group-based communication message metadata from the group-based communication message prior to transmitting the group-based communication encrypt request.

In embodiments, access to encryption keys from the group-based communication key material source is controlled by a third party data owner.

In embodiments, an apparatus for providing decrypted group-based communication messages to a group-based communication server comprises at least one processor and at least one non-transitory memory storing instructions that, when executed by the processor, configure the apparatus to provide decrypted group-based communication messages to a group-based communication server.

In embodiments, the apparatus is configured to receive, from the group-based communication server, a group-based communication message decrypt request, the group-based communication message decrypt request comprising a group-based communication message keyscope component set, encryption key ciphertext, and group-based communication message ciphertext, the group-based communication message keyscope component set comprising one or more keyscope components associated with the group-based communication message.

In embodiments, the apparatus is configured to retrieve, from at least one local memory, a group-based communication message encryption key associated with the encryption key ciphertext.

In embodiments, the apparatus is configured to decrypt the group-based communication message ciphertext using the group-based communication message encryption key to produce group-based communication message plaintext.

In embodiments, the apparatus is configured to transmit, to the group-based communication server, the group-based communication message plaintext.

In embodiments, the apparatus is configured to, upon determining that a group-based communication message encryption key associated with the encryption key ciphertext is not stored in the at least one local memory, transmit an encryption key generation request to a group-based communication key material source, the encryption key generation request comprising the group-based communication message keyscope component set and the encryption key ciphertext.

In embodiments, the apparatus is configured to receive, from the group-based communication key material source, a group-based communication message encryption key.

In embodiments, the apparatus is configured to store, in the at least one local memory, the group-based communication message encryption key.

In embodiments, the group-based communication server provides the group-based communication message plaintext to a group-based communication storage management service for use in generating a search index.

In embodiments, an apparatus for servicing group-based communication queries comprises at least one processor and at least one non-transitory memory storing instructions that, when executed by the processor, configure the apparatus to service group-based communication queries.

In embodiments, the apparatus is configured to receive, from a group-based communication search server, a group-based communication search index encryption request, the group-based communication search index encryption request comprising an encrypted search index encryption key and a group-based communication organization identifier.

In embodiments, the apparatus is configured to retrieve, from at least one local memory, an organization encryption key associated with the group-based communication organization identifier.

In embodiments, the apparatus is configured to decrypt the encrypted search index encryption key using the organization encryption key to produce a decrypted group-based communication search index encryption key.

In embodiments, the apparatus is configured to transmit, to the group-based communication search server, the decrypted group-based communication search index encryption key.

In embodiments, the apparatus is configured to, upon determining that an organization encryption key associated with the group-based communication organization identifier is not stored in at least one local memory, transmit, to a group-based communication key material source, an encryption key generation request, the encryption key generation request comprising the group-based communication organization identifier.

In embodiments, the apparatus is configured to receive, from the group-based communication key material source, an organization encryption key.

In embodiments, the apparatus is configured to store, in the at least one local memory, the organization encryption key.

In embodiments, the apparatus is configured to receive, from the group-based communication server, a group-based communication message decrypt request, the group-based communication message decrypt request comprising a group-based communication message keyscope component set, encryption key ciphertext, and group-based communication message ciphertext, the keyscope component set comprising one or more keyscope components associated with the group-based communication message.

In embodiments, the apparatus is configured to retrieve, from at least one local memory, a group-based communication message encryption key associated with the encryption key ciphertext.

In embodiments, the apparatus is configured to decrypt the group-based communication message ciphertext using the group-based communication message encryption key to produce group-based communication message plaintext.

In embodiments, the apparatus is configured to transmit, to the group-based communication server, the group-based communication message plaintext.

In embodiments, the apparatus is configured to, upon determining that a group-based communication message encryption key associated with the encryption key ciphertext is not stored in the at least one local memory, transmit an encryption key generation request to a group-based communication key material source, the encryption key generation request comprising the group-based communication message keyscope component set and the encryption key ciphertext.

In embodiments, the apparatus is configured to receive, from the group-based communication key material source, a group-based communication message encryption key.

In embodiments, the apparatus is configured to store, in the at least one local memory, the group-based communication message encryption key.

In embodiments, the apparatus is configured to receive, from the group-based communication server, a group-based communication file decrypt request, the group-based communication file decrypt request comprising a group-based communication file keyscope component set, encryption key ciphertext, and group-based communication file ciphertext, the keyscope component set comprising one or more keyscope components associated with the group-based communication file.

In embodiments, the apparatus is configured to retrieve, from at least one local memory, a group-based communication file encryption key associated with the encryption key ciphertext.

In embodiments, the apparatus is configured to decrypt the group-based communication file ciphertext using the group-based communication file encryption key to produce group-based communication file plaintext.

In embodiments, the apparatus is configured to transmit, to the group-based communication server, the group-based communication file plaintext.

In embodiments, the apparatus is configured to, upon determining that a group-based communication file encryption key associated with the encryption key ciphertext is not stored in the at least one local memory, transmit an encryption key generation request to a group-based communication key material source, the encryption key generation request comprising the group-based communication file keyscope component set and the encryption key ciphertext.

In embodiments, the apparatus is configured to receive, from the group-based communication key material source, a group-based communication file encryption key.

In embodiments, the apparatus is configured to store, in the at least one local memory, the group-based communication file encryption key.

In embodiments, the group-based communication search server receives a group-based communication search query from a group-based communication server prior to transmitting the group-based communication search index encryption key request, the group-based communication server having received the group-based communication search query from a client device.

In embodiments, the group-based communication search server returns group-based communication search results to a group-based communication server and a group-based communication repository.

In embodiments, the group-based communication server transmits group-based communication search results to a client device.

In embodiments, an apparatus for generating an encrypted group-based communication search index encryption key comprises at least one processor and at least one non-transitory memory storing instructions that, when executed by the processor, configure the apparatus to generate an encrypted group-based communication search index encryption key.

In embodiments, the apparatus is configured to receive, from a group-based communication search server, a group-based communication search index encryption key, the group-based communication search index encryption key associated with a group-based communication organization identifier.

In embodiments, the apparatus is configured to retrieve, from at least one local memory, an organization encryption key associated with the group-based communication organization identifier.

In embodiments, the apparatus is configured to encrypt the group-based communication search index encryption key using the organization encryption key to produce an encrypted group-based communication search index encryption key.

In embodiments, the apparatus is configured to transmit, to the group-based communication search server, the encrypted group-based communication search index encryption key.

In embodiments, the apparatus is configured to, upon determining that an organization encryption key associated with the group-based communication organization identifier is not stored in at least one local memory, transmit an encryption key generation request to a group-based communication key material source, the encryption key generation request comprising the group-based communication organization identifier.

In embodiments, the apparatus is configured to receive, from the group-based communication key material source, the organization encryption key and store, in the at least one local memory, the organization encryption key.

In embodiments, the group-based communication search index encryption key is generated by a group-based communication storage management service and transmitted to the group-based communication search server.

In embodiments, an apparatus for providing encrypted group-based communication files to a group-based communication server comprises at least one processor and at least one non-transitory memory storing instructions that, when executed by the processor, configure the apparatus to provide encrypted group-based communication files to a group-based communication server.

In embodiments, the apparatus is configured to receive, from the group-based communication server, a group-based communication file encrypt request, the group-based communication file encrypt request comprising a group-based communication key family identifier, a group-based communication file keyscope component set, and group-based communication file plaintext.

In embodiments, the apparatus is configured to retrieve, from at least one local memory, a group-based communication file encryption key associated with the group-based communication file keyscope component set and key family identifier.

In embodiments, the apparatus is configured to encrypt the group-based communication file plaintext using the group-based communication file encryption key to produce a group-based communication file ciphertext.

In embodiments, the apparatus is configured to transmit, to the group-based communication server, the group-based communication file ciphertext, the group-based communication file keyscope component set, and encryption key ciphertext associated with the group-based communication file encryption key, wherein the group-based communication server stores the group-based communication file ciphertext, the group-based communication file keyscope component set, and the encryption key ciphertext associated with the group-based communication file encryption key in a group-based communication repository.

In embodiments, the apparatus is configured to, upon determining that a group-based communication message encryption key associated with the group-based communication file keyscope component set and group-based communication key family identifier is not stored in the at least one local memory, transmit an encryption key generation request to a group-based communication key material source, the encryption key generation request comprising the group-based communication file keyscope component set and the group-based communication key family identifier.

In embodiments, the apparatus is configured to receive, from the group-based communication key material source, the group-based communication file encryption key and encryption key ciphertext associated with the group-based communication message encryption key.

In embodiments, the apparatus is configured to store the group-based communication file encryption key and encryption key ciphertext associated with the group-based communication file encryption key in the at least one local memory.

In embodiments, an apparatus for providing decrypted group-based communication files to a group-based communication server comprises at least one processor and at least one non-transitory memory storing instructions that, when executed by the processor, configure the apparatus to provide decrypted group-based communication files to a group-based communication server.

In embodiments, the apparatus is configured to receive, from the group-based communication server, a group-based communication file decrypt request, the group-based communication file decrypt request comprising a group-based communication file keyscope component set, encryption key ciphertext, and group-based communication file ciphertext, the group-based communication file keyscope component set comprising one or more keyscope components associated with a group-based communication file.

In embodiments, the apparatus is configured to retrieve, from at least one local memory, a group-based communication file encryption key associated with the encryption key ciphertext.

In embodiments, the apparatus is configured to decrypt the group-based communication file ciphertext using the group-based communication file encryption key to produce group-based communication file plaintext.

In embodiments, the apparatus is configured to transmit, to the group-based communication server, the group-based communication file plaintext.

In embodiments, the apparatus is configured to, upon determining that a group-based communication file encryption key associated with the encryption key ciphertext is not stored in the at least one local memory, transmit an encryption key generation request to a group-based communication key material source, the encryption key generation request comprising the group-based communication file keyscope component set and the encryption key ciphertext.

In embodiments, the apparatus is configured to receive, from the group-based communication key material source, a group-based communication file encryption key and store, in the at least one local memory, the group-based communication file encryption key.

Computer program products and computer implemented methods are also configured to implement embodiments of the present disclosure.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
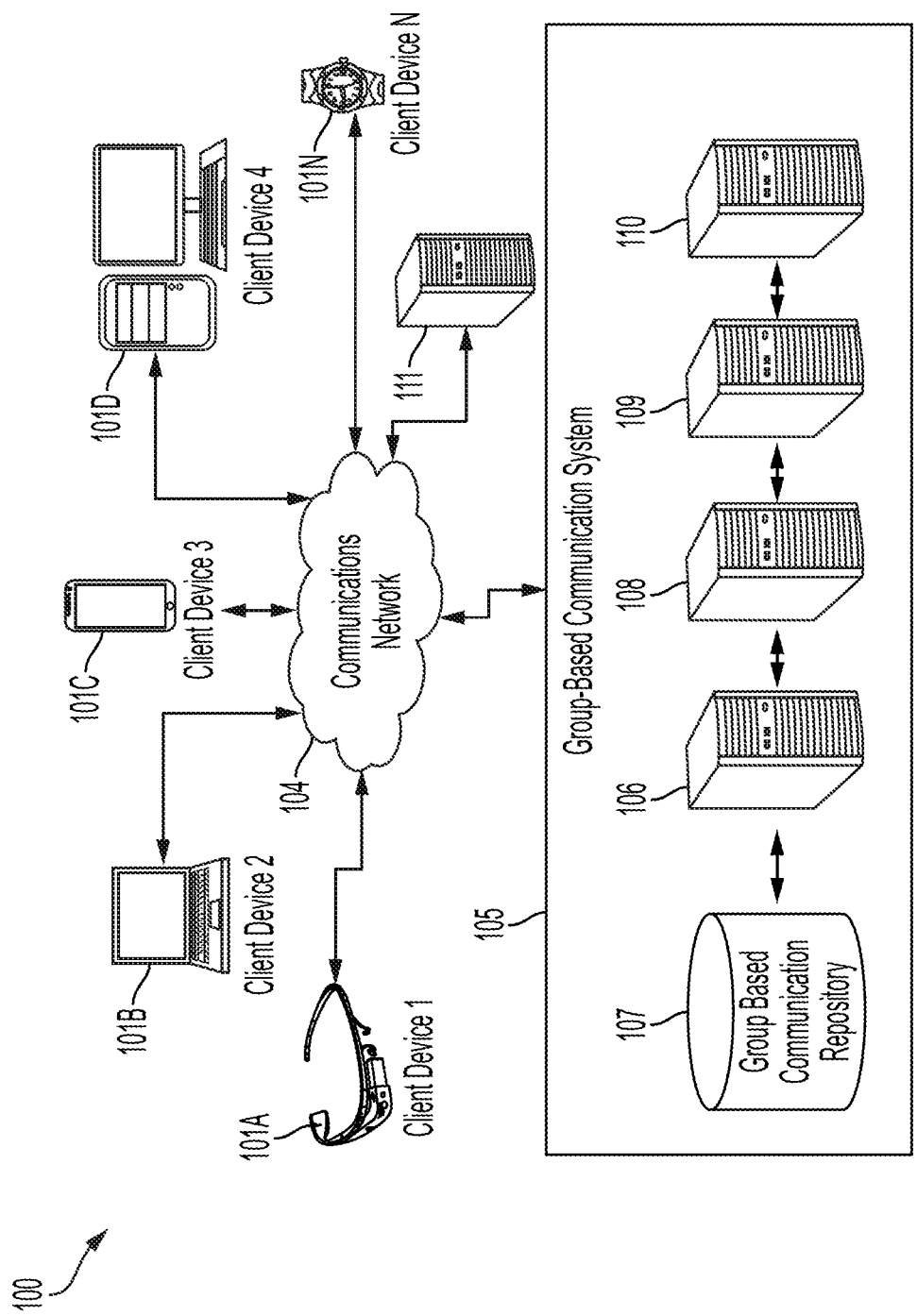
Figure 2A:
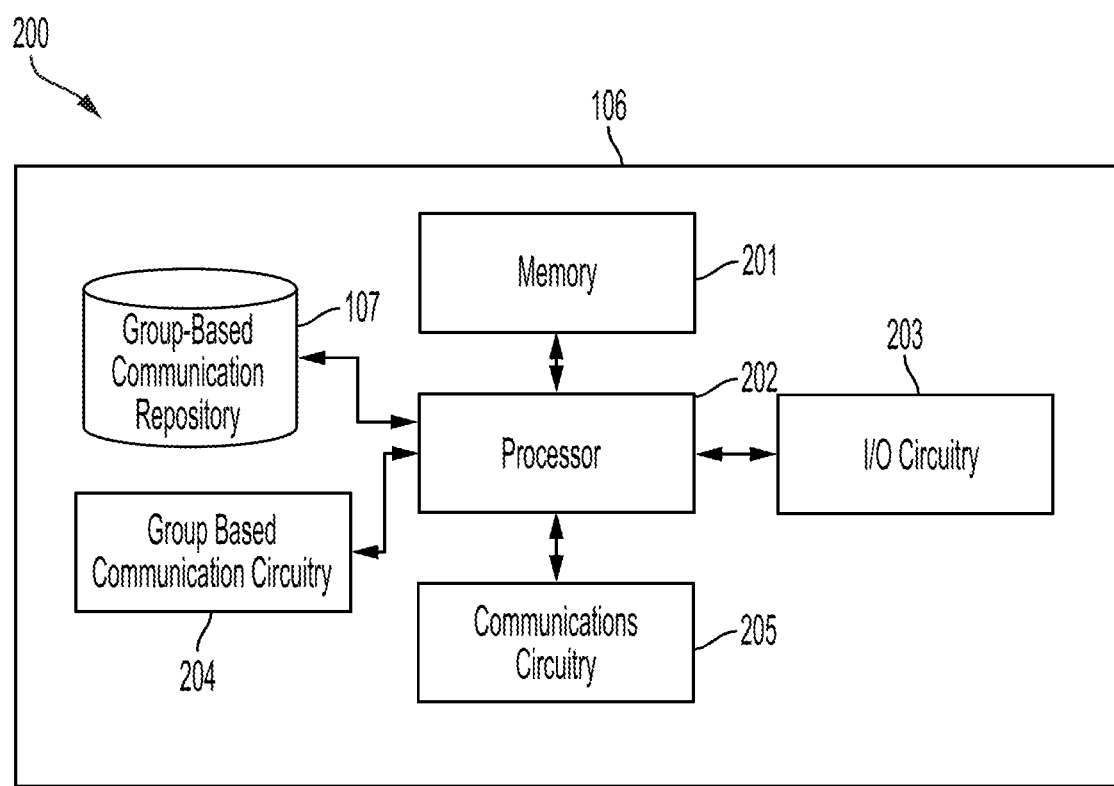
Figure 2B:
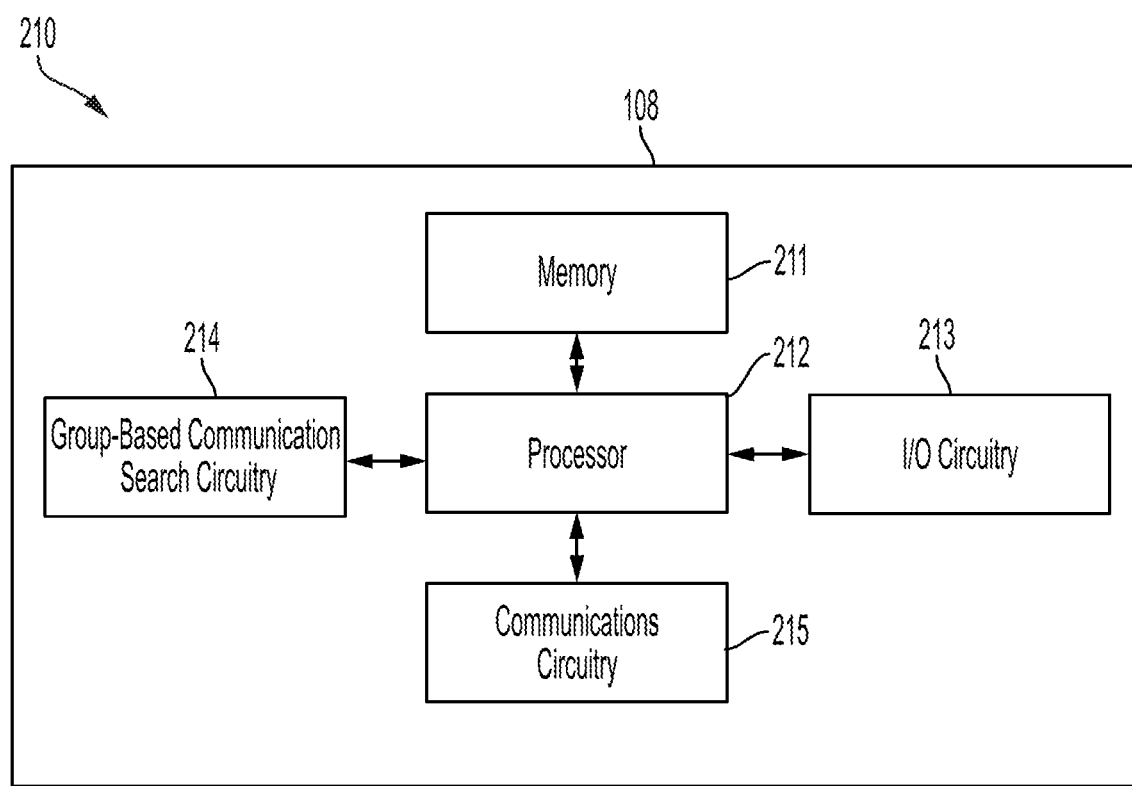
Figure 2C:
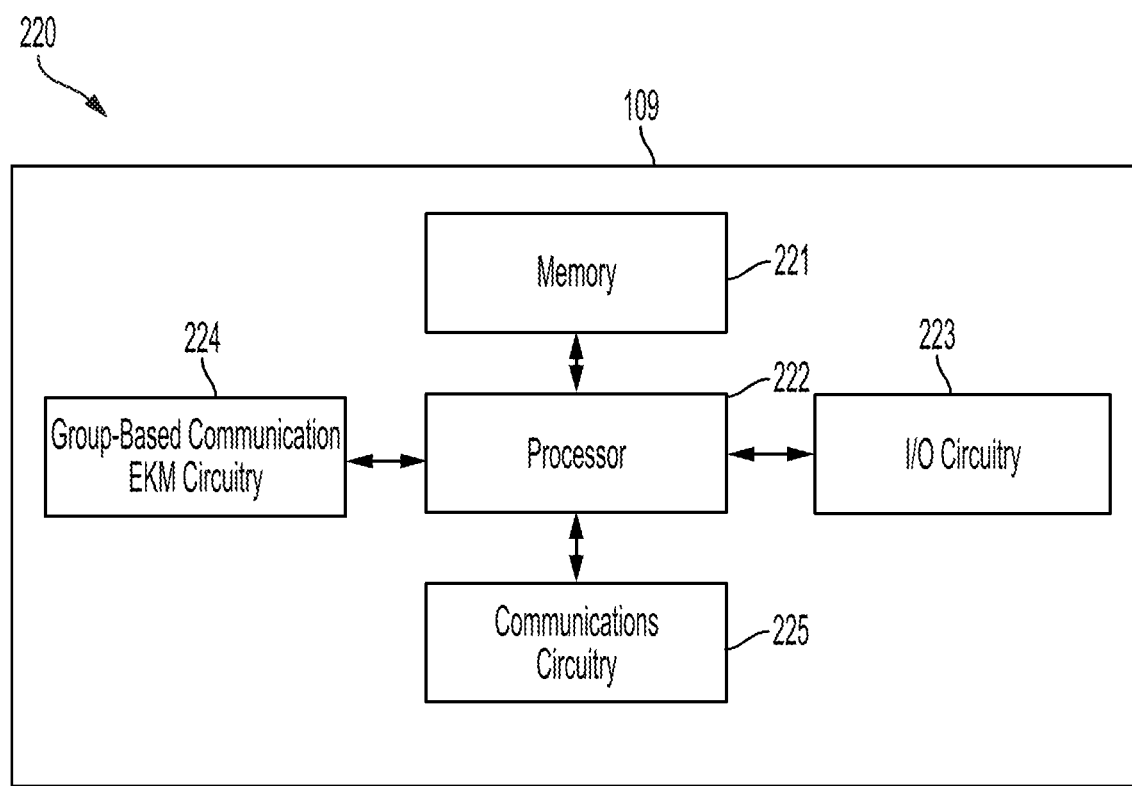
Figure 2D:
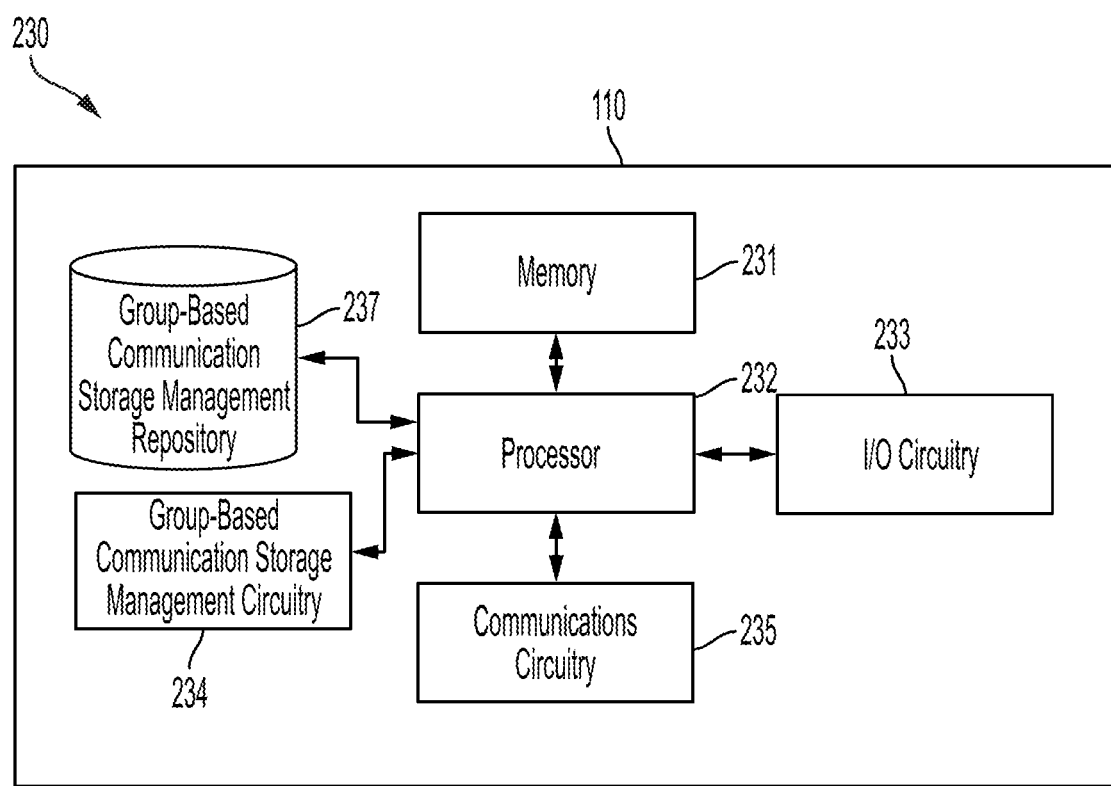
Figure 2E:
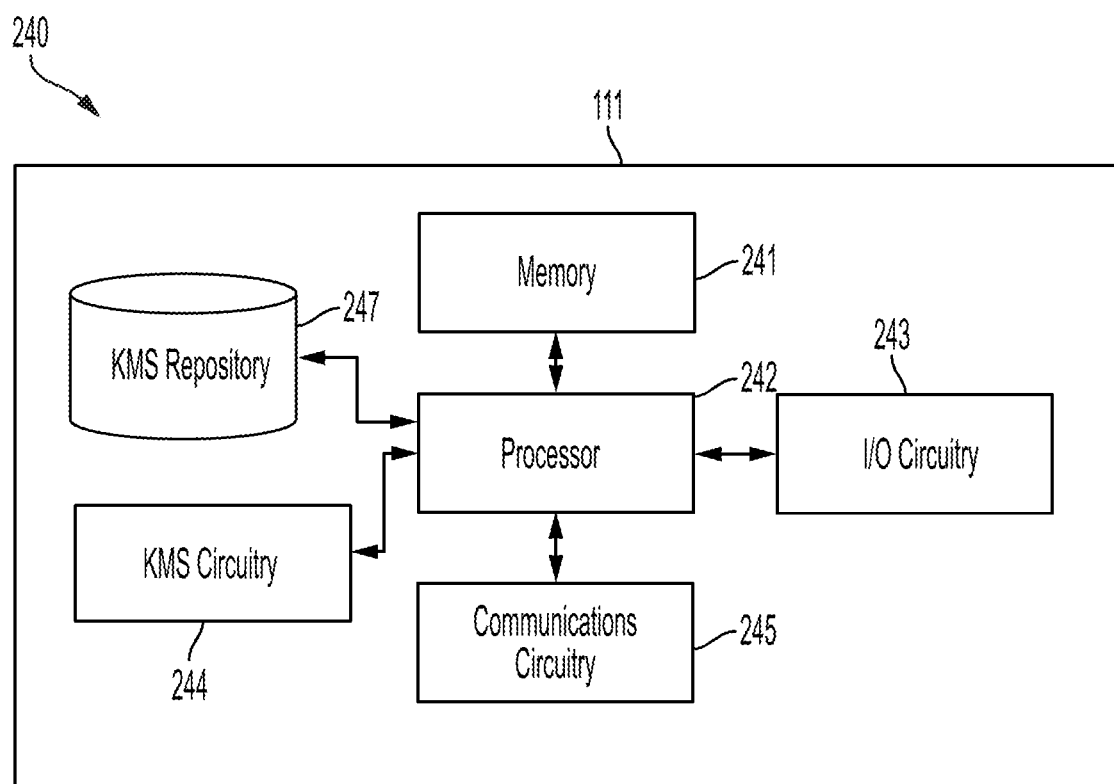
Figure 3A:
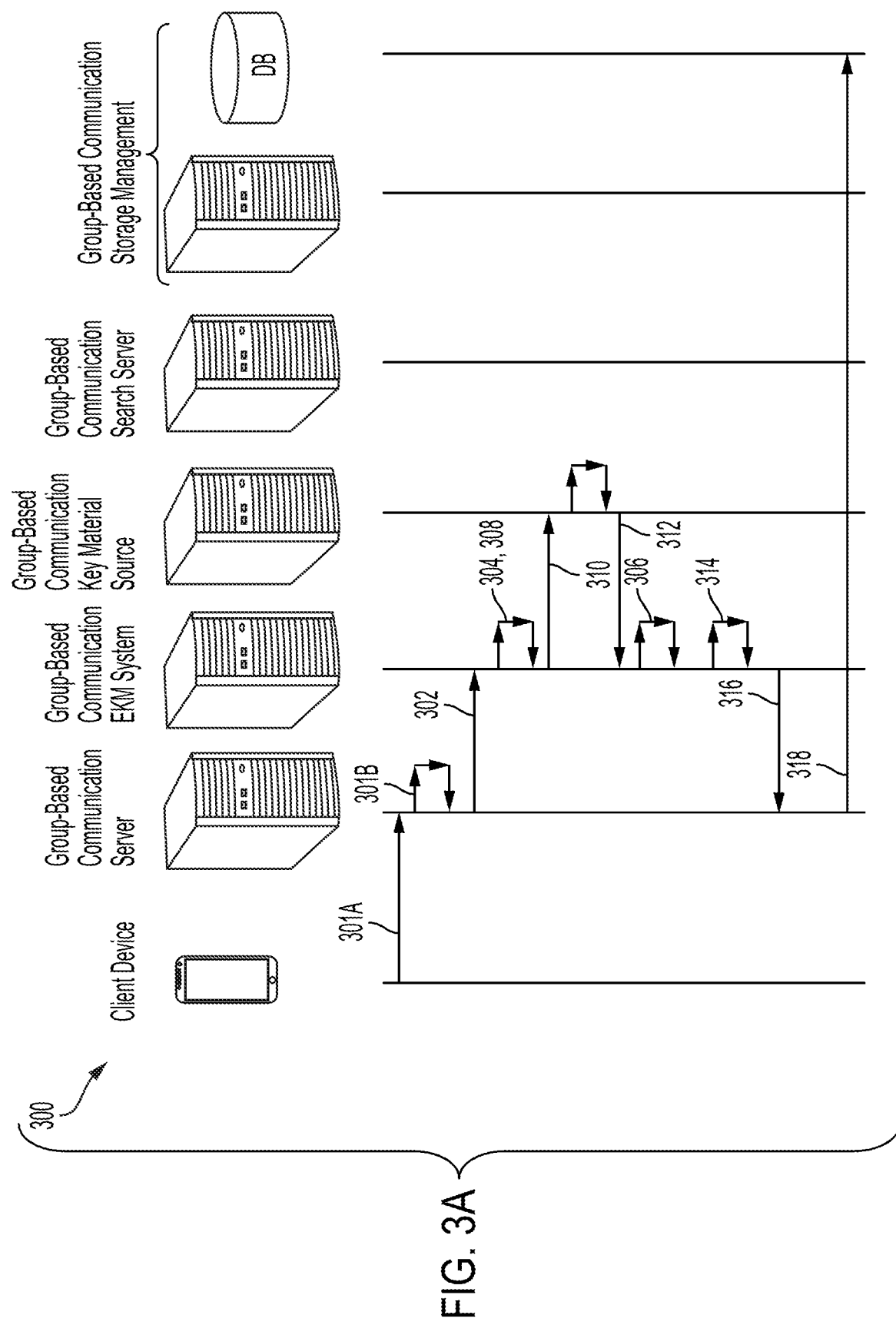
Figure 3B:
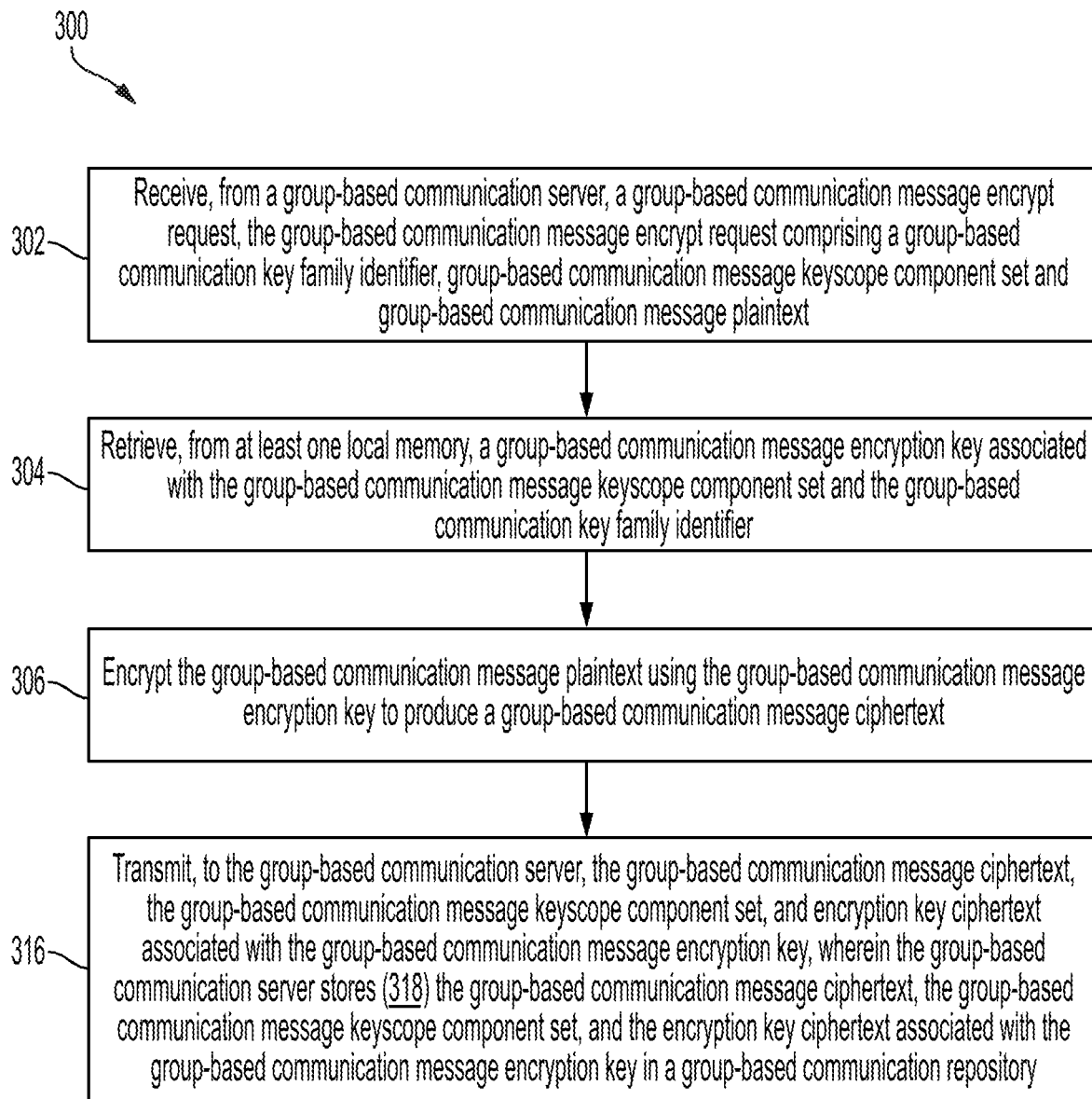
Figure 3C:
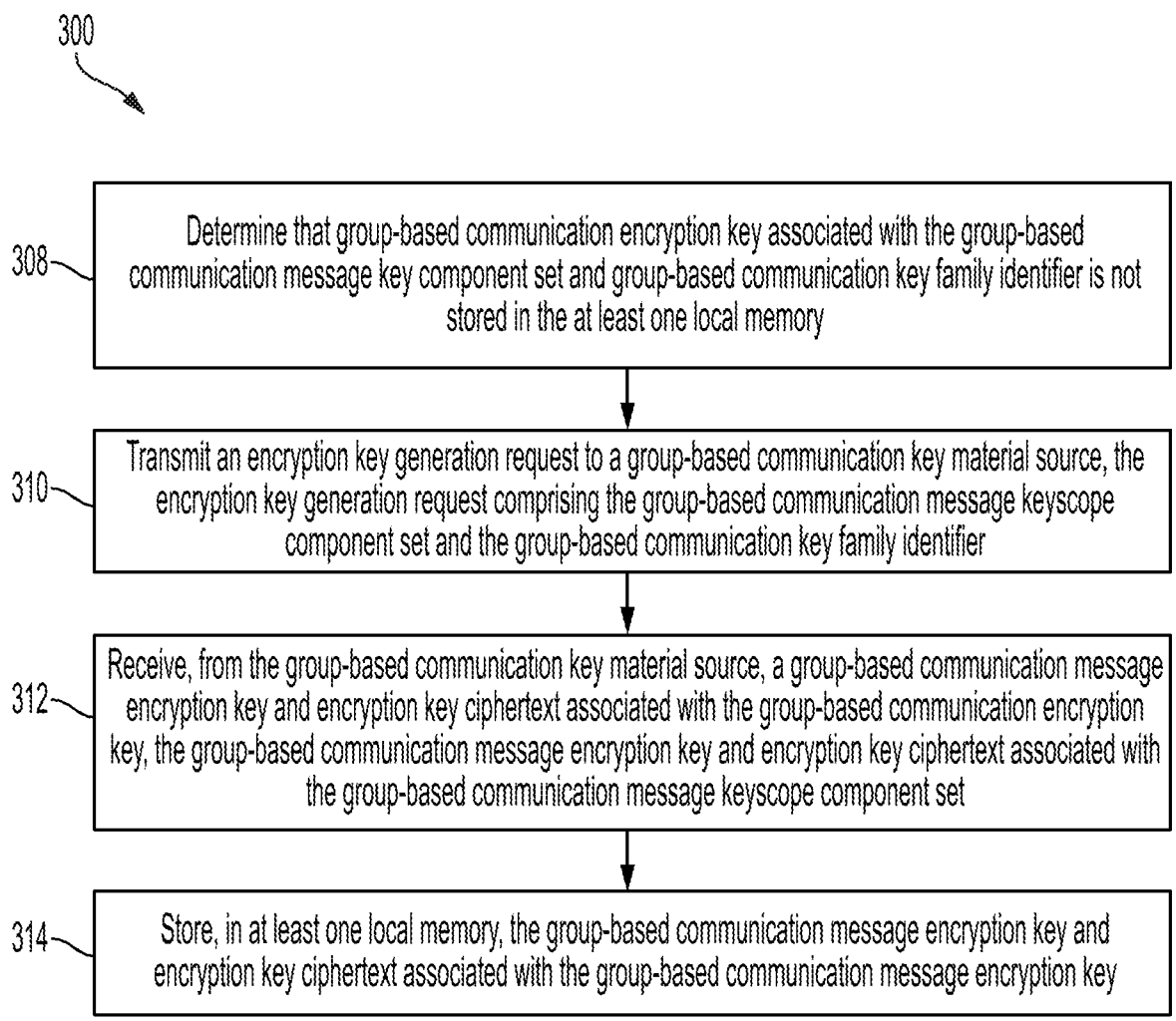
Figure 3D:
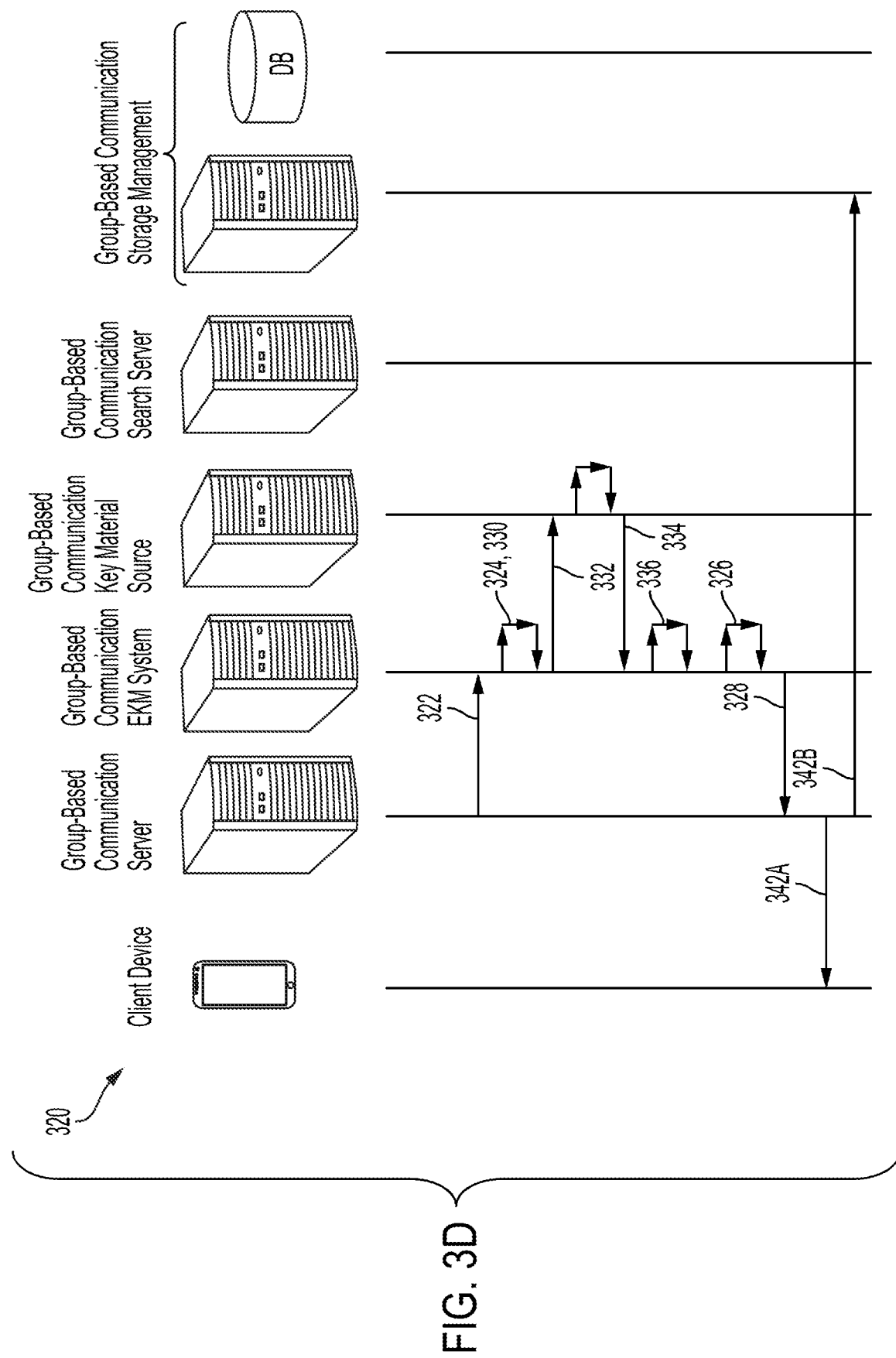
Figure 3E:
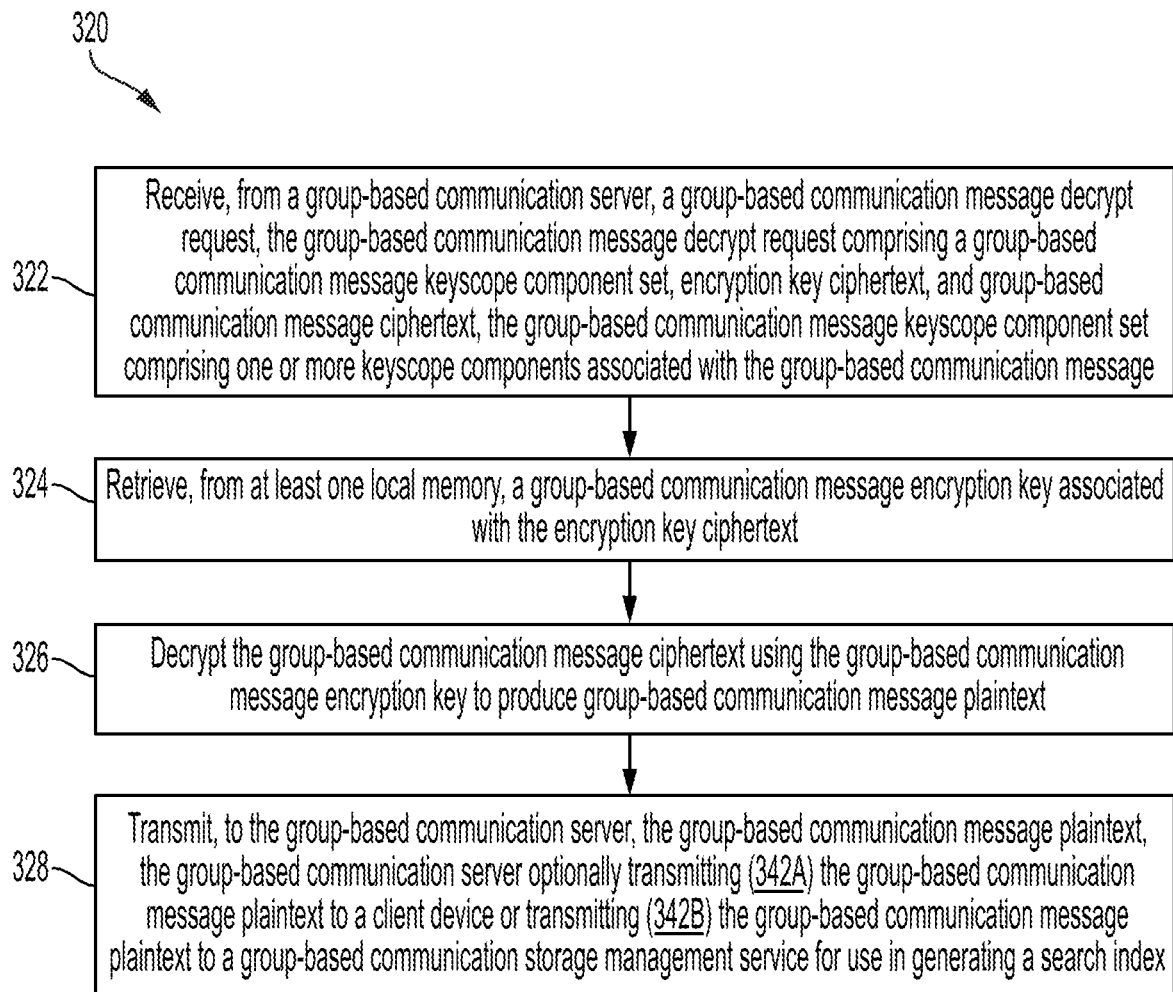
Figure 3F:
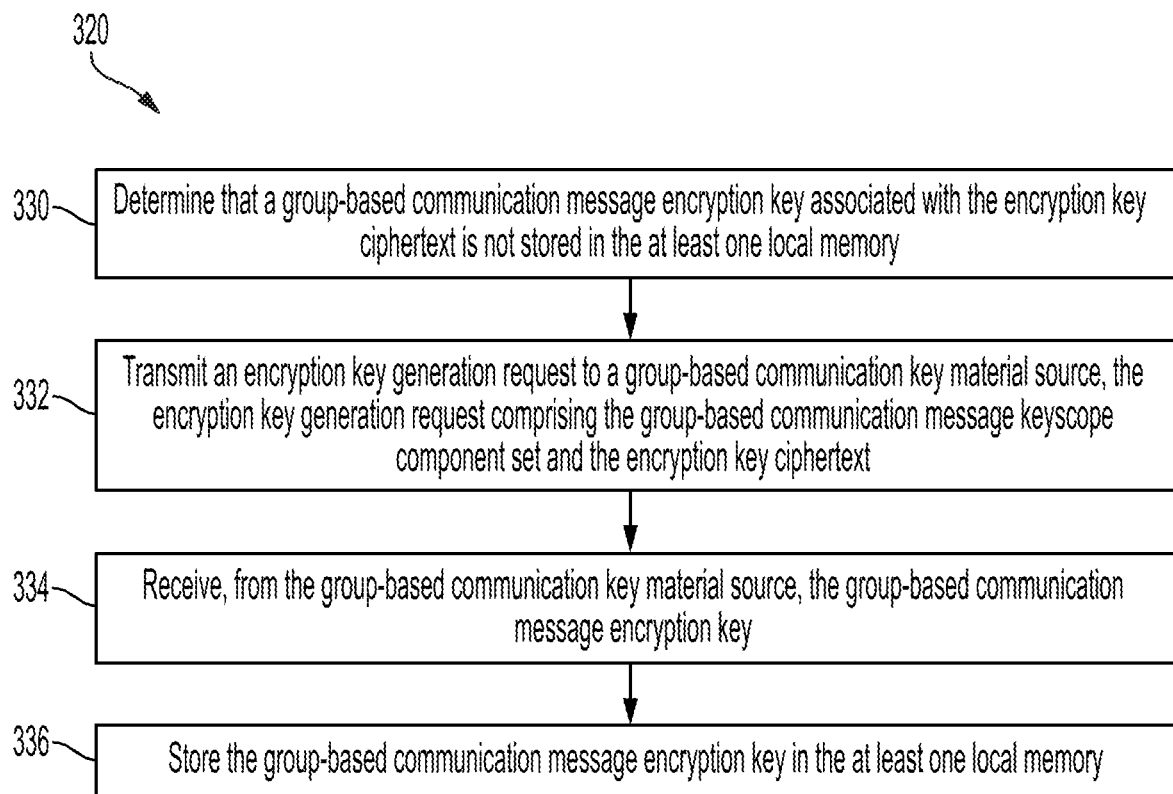
Figure 3G:
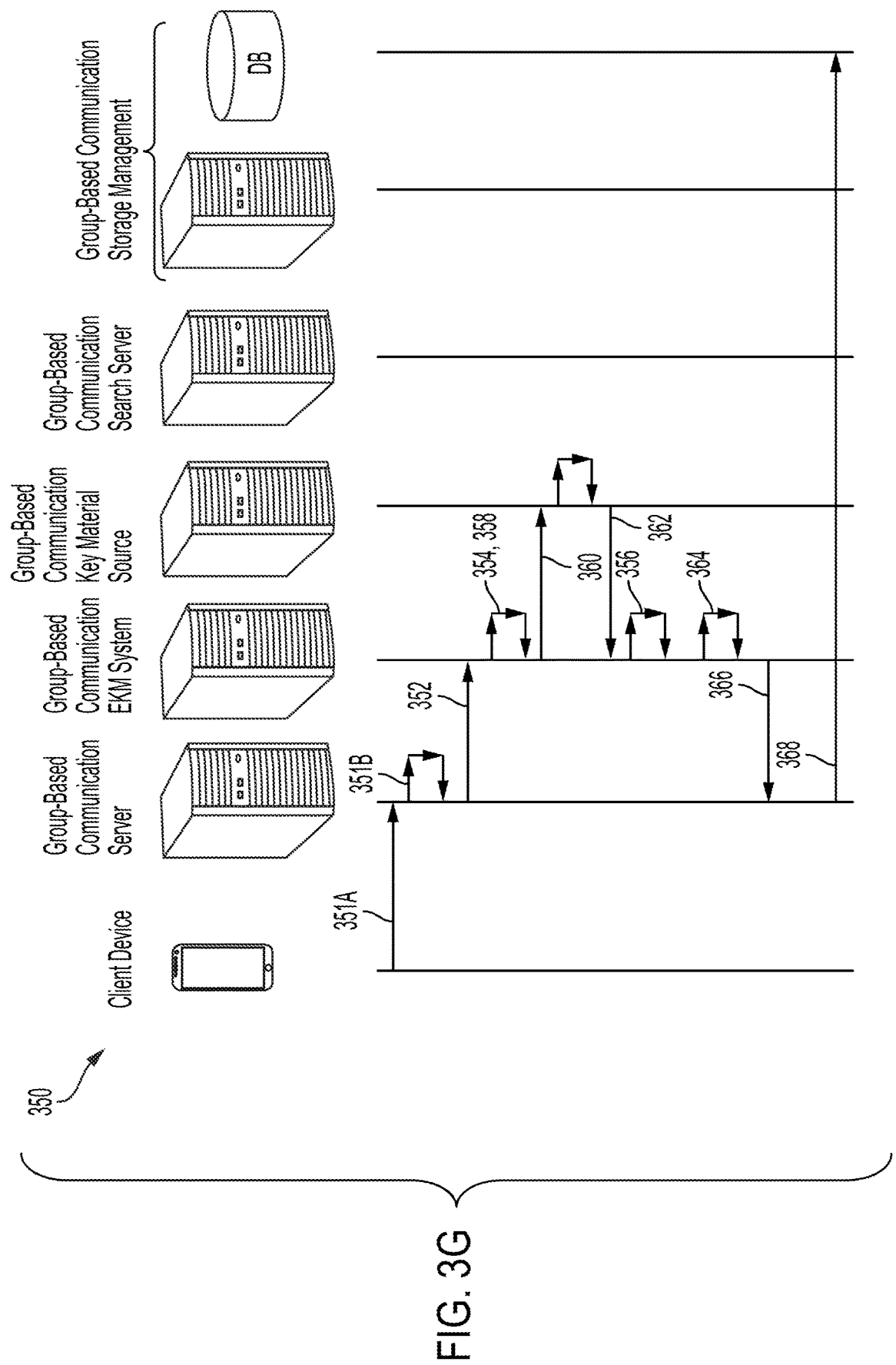
Figure 3H:
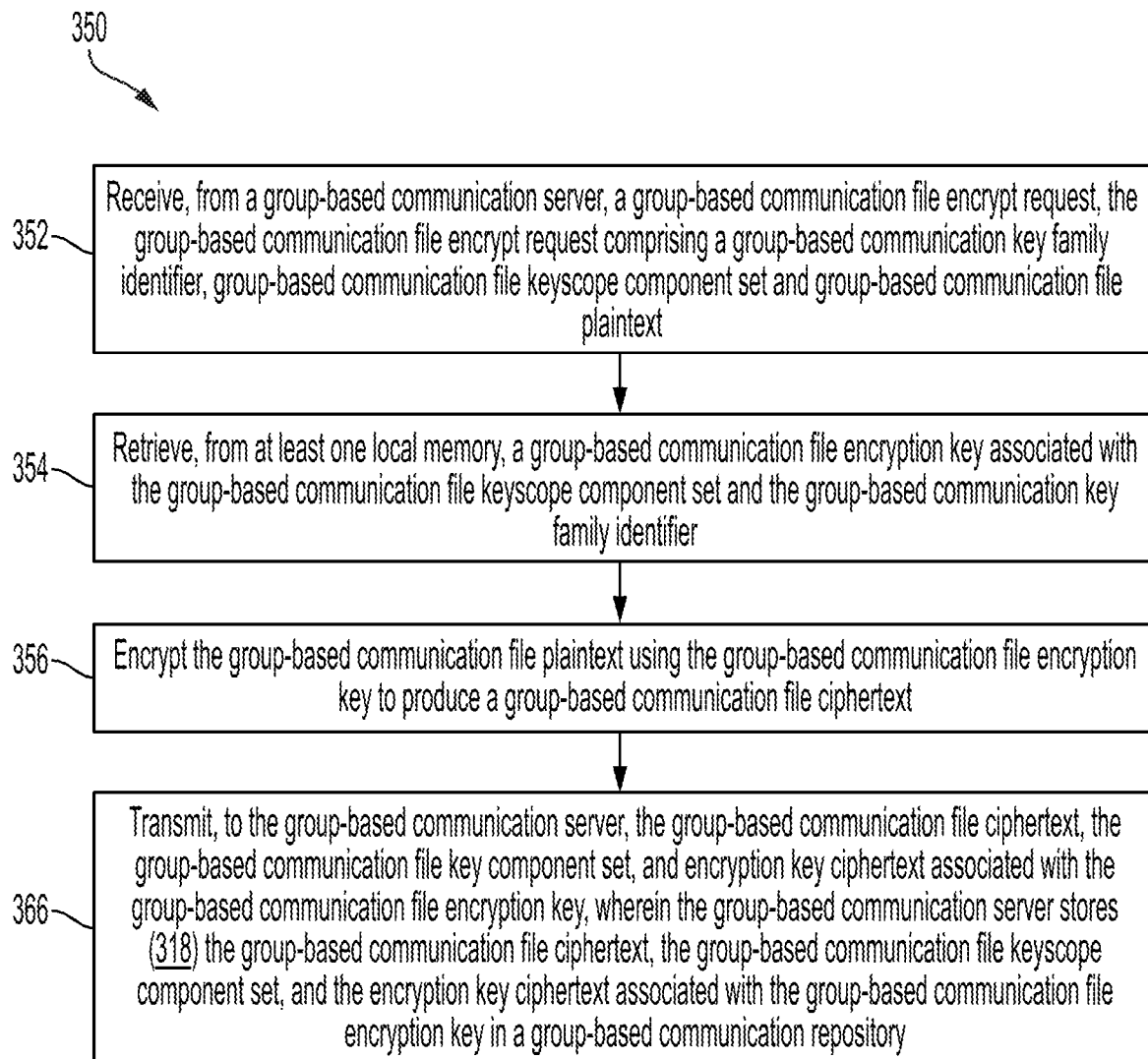
Figure 3I:
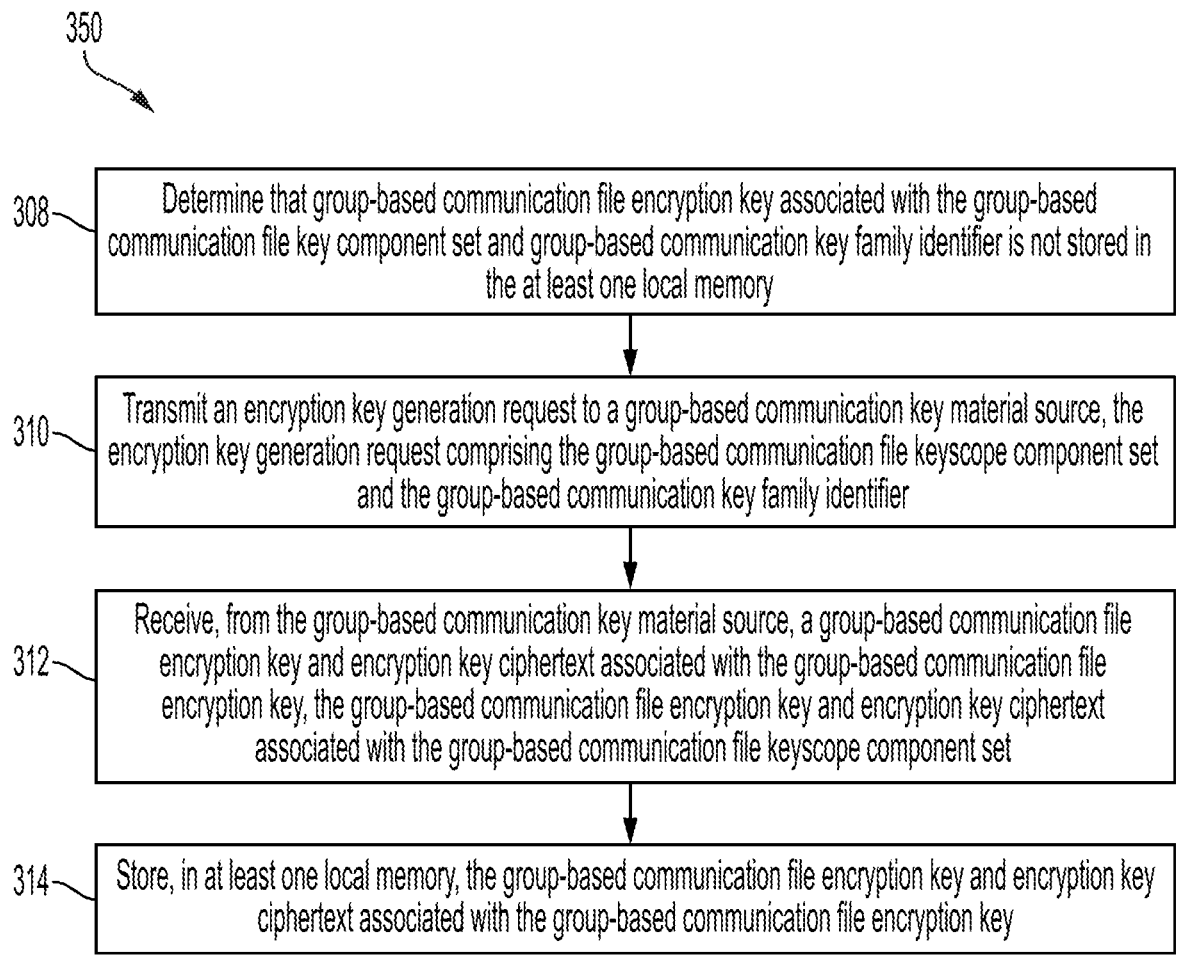
Figure 3J:
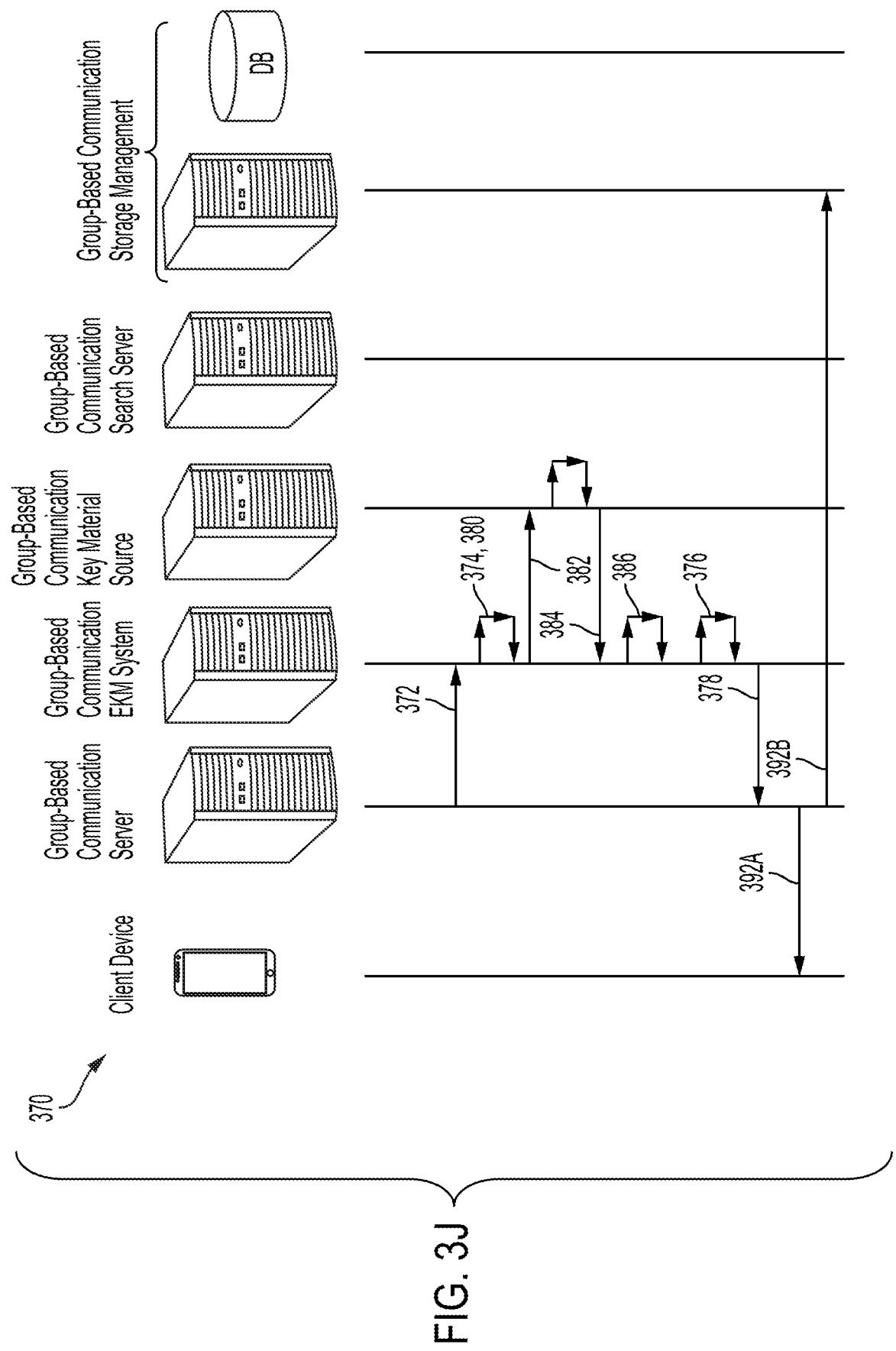
Figure 3K:
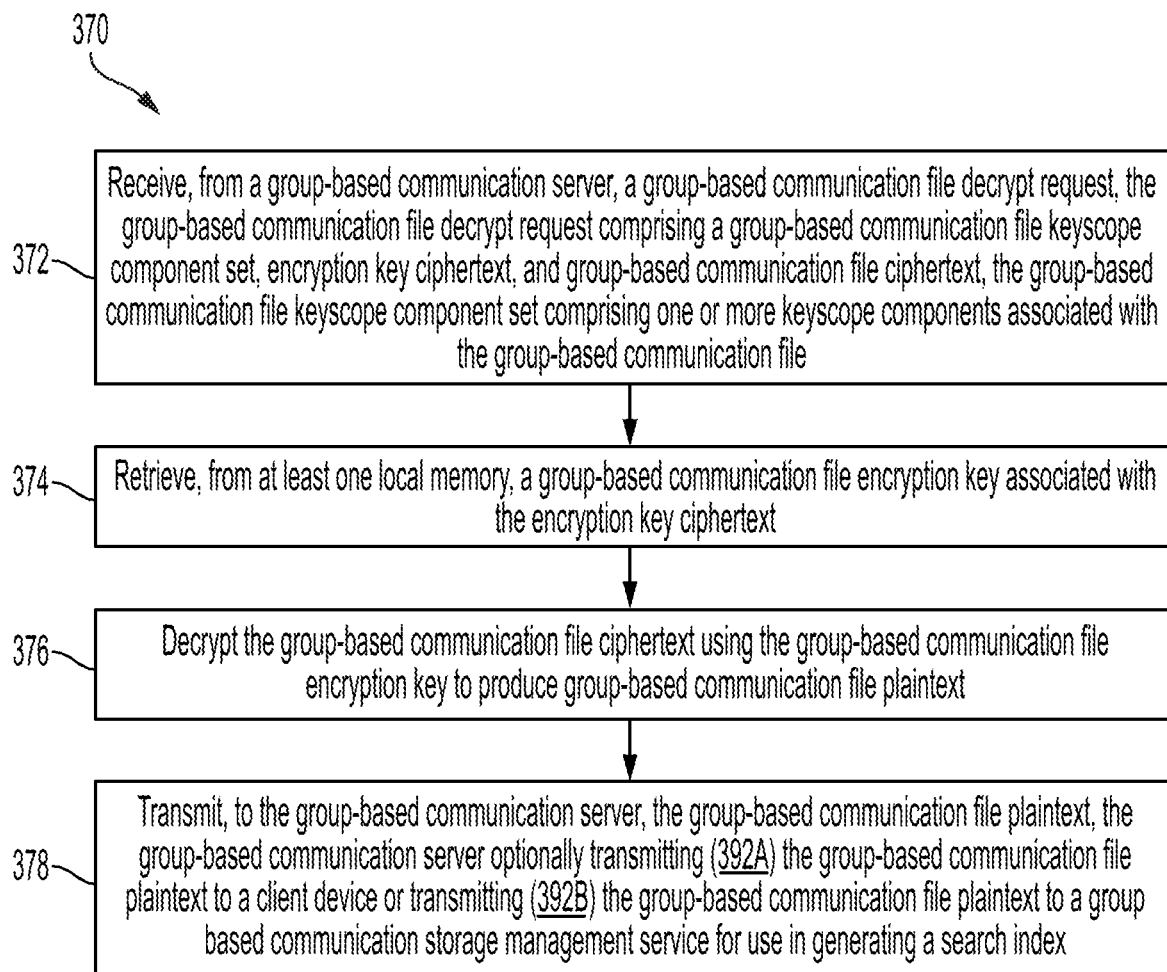
Figure 3L:
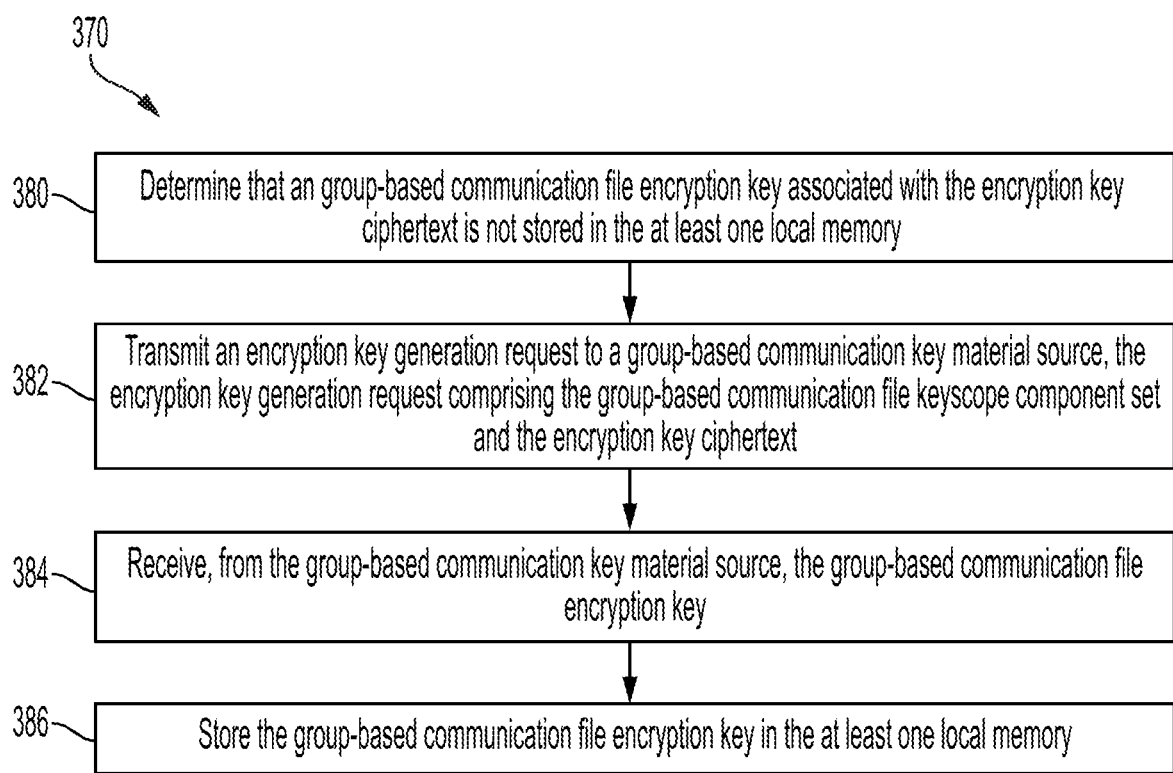
Figure 4A:
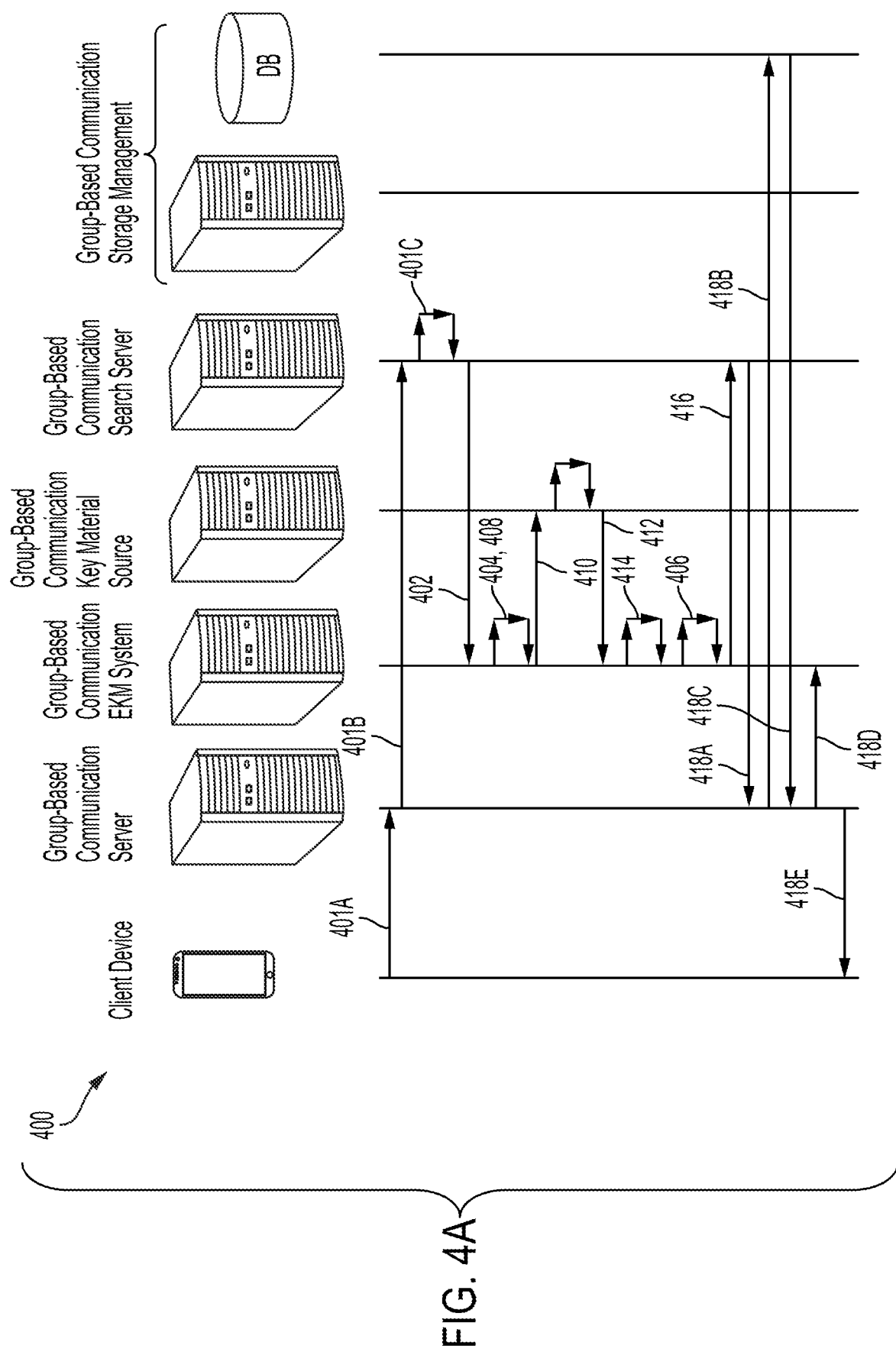
Figure 4B:
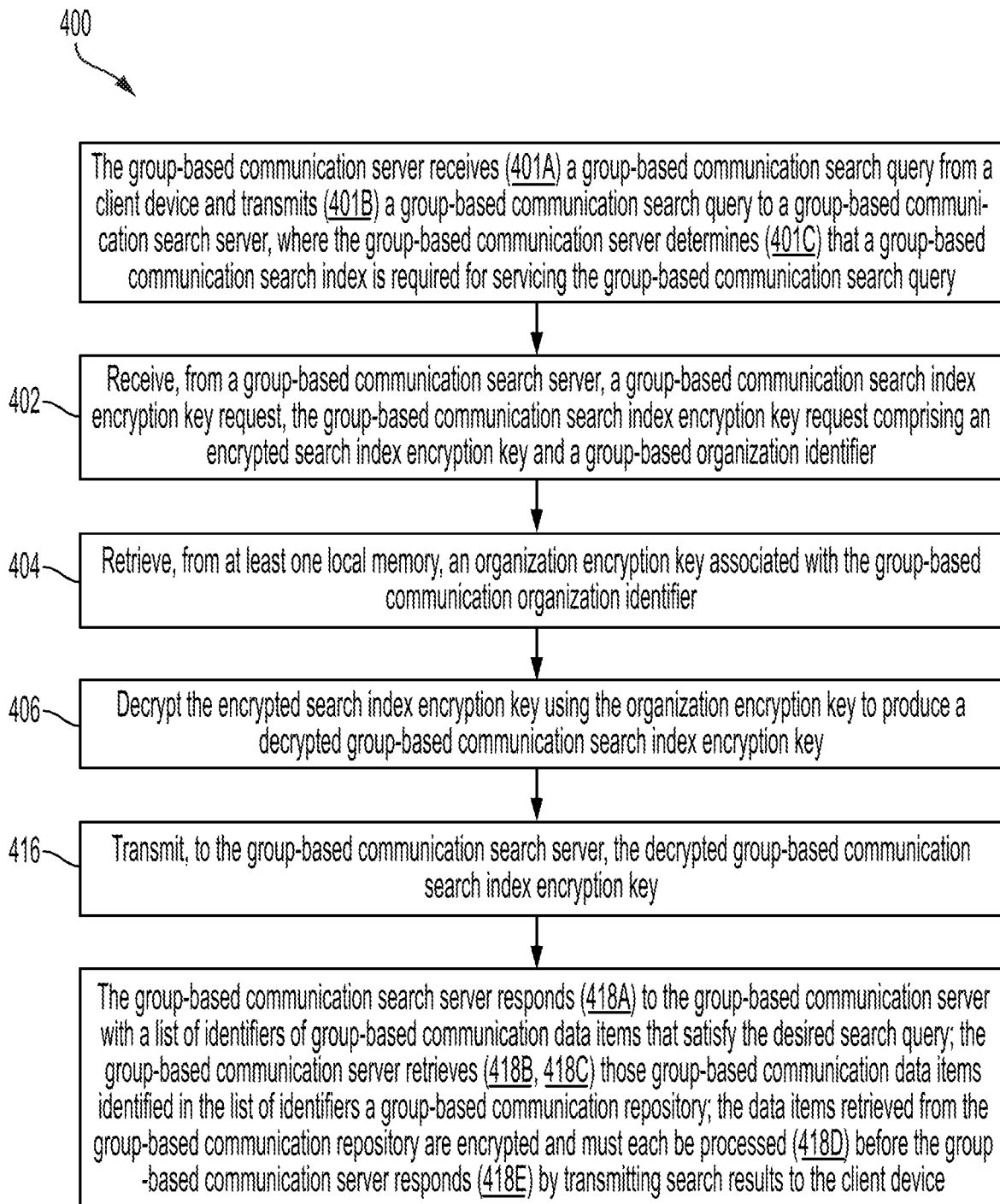
Figure 4C:
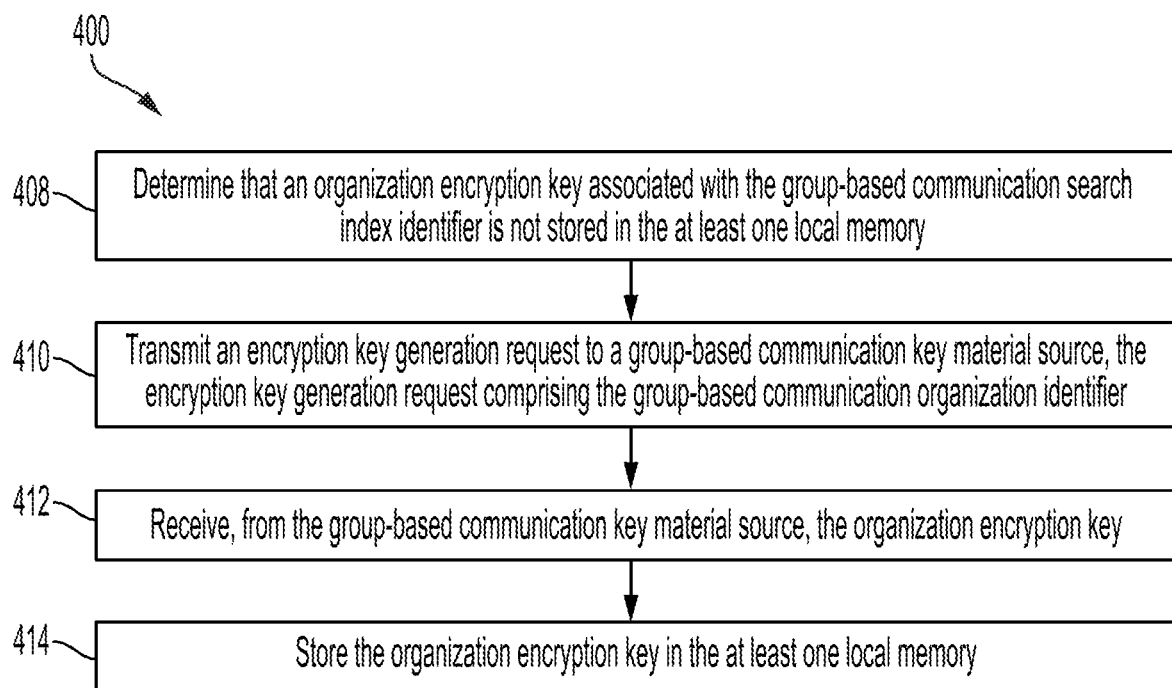
Figure 5A:
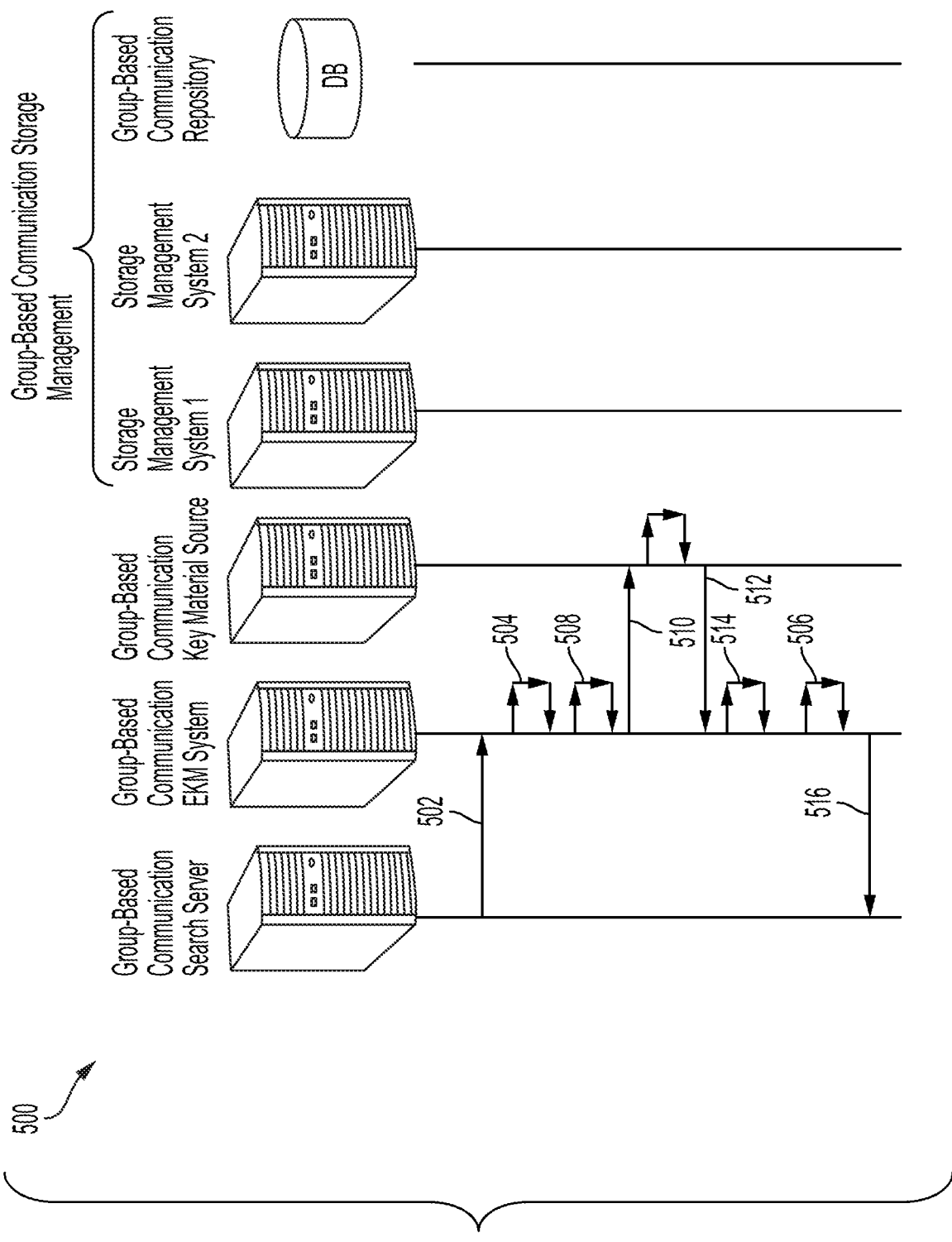
Figure 5B:
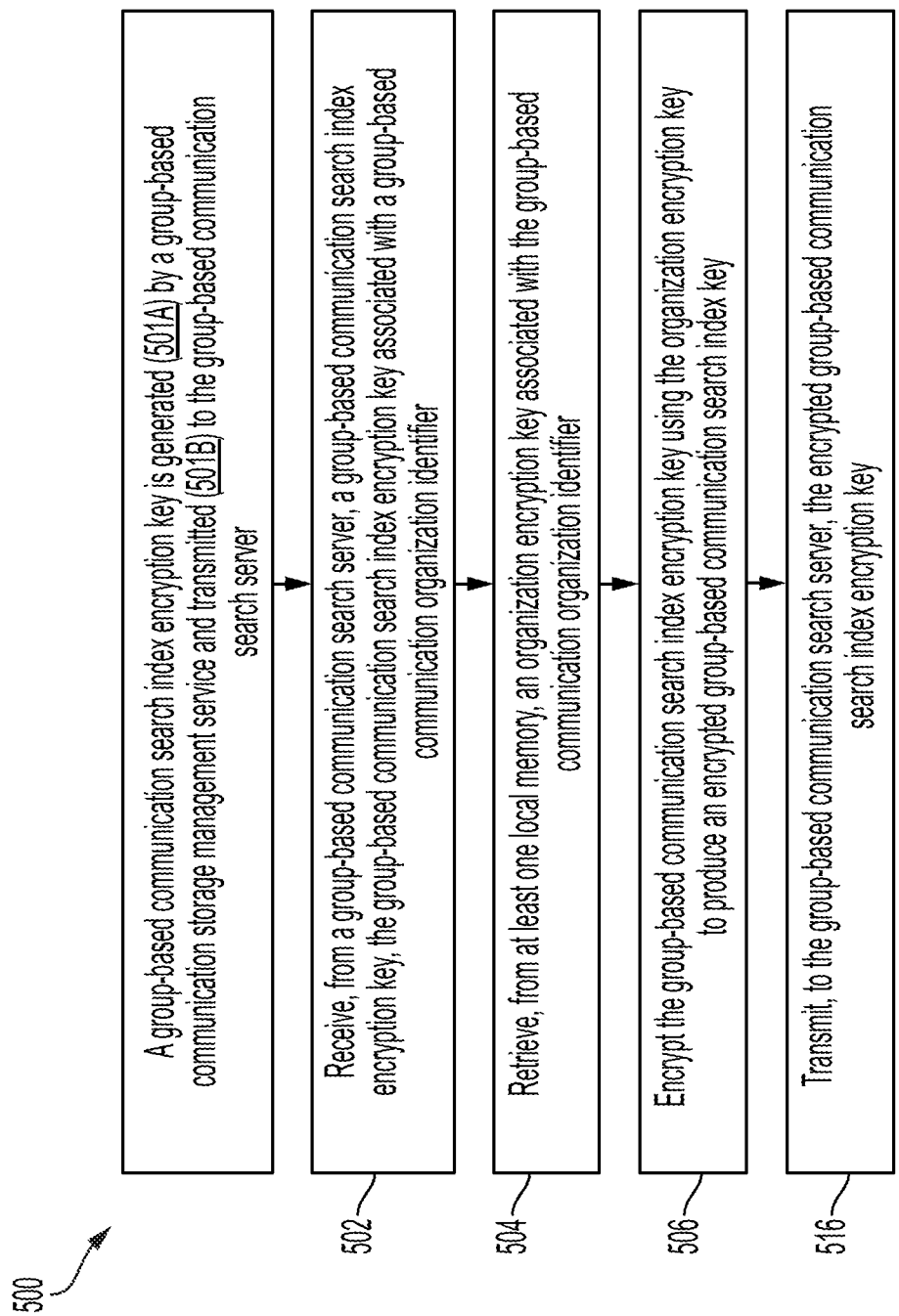
Figure 6A:
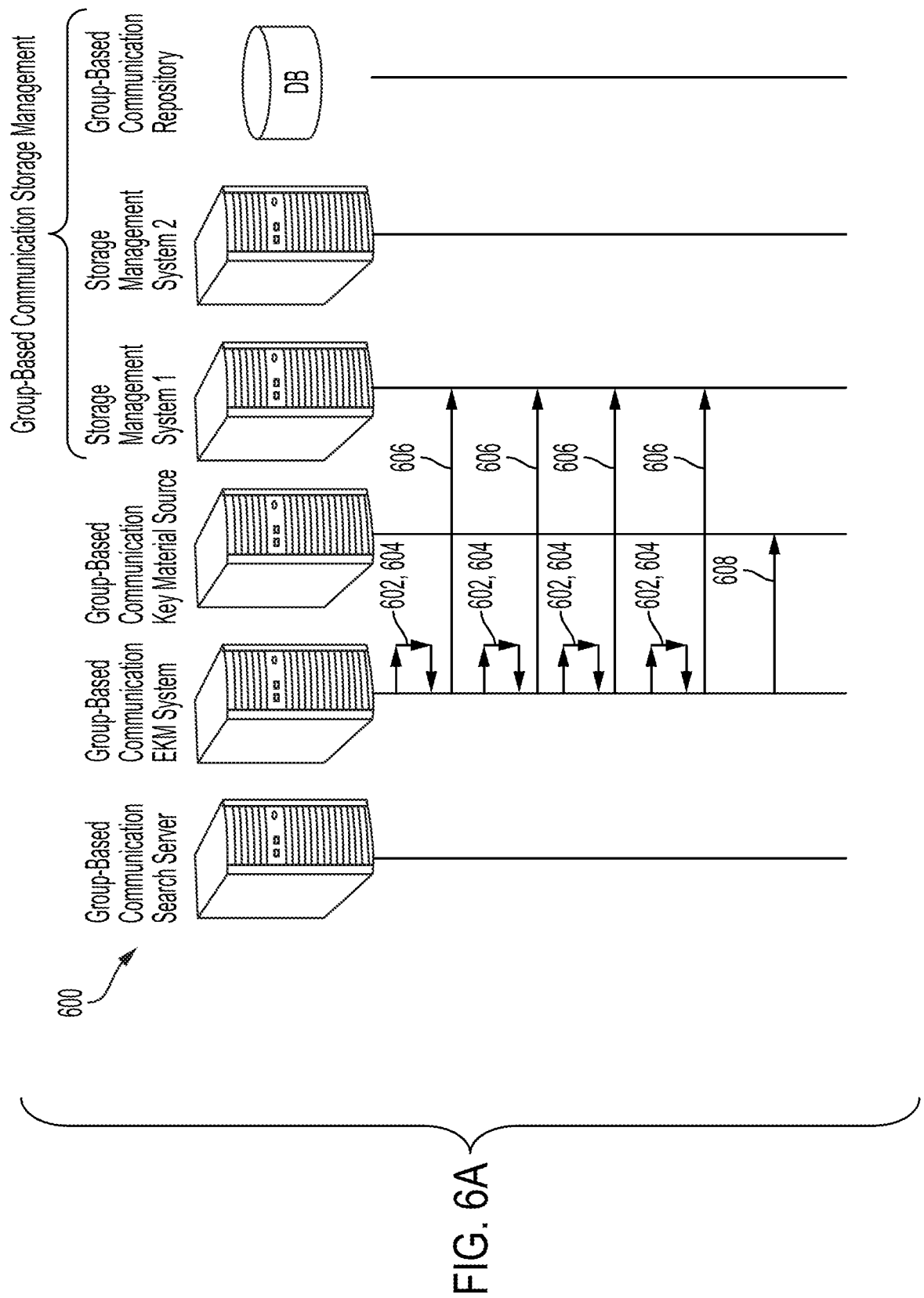
Figure 6B:
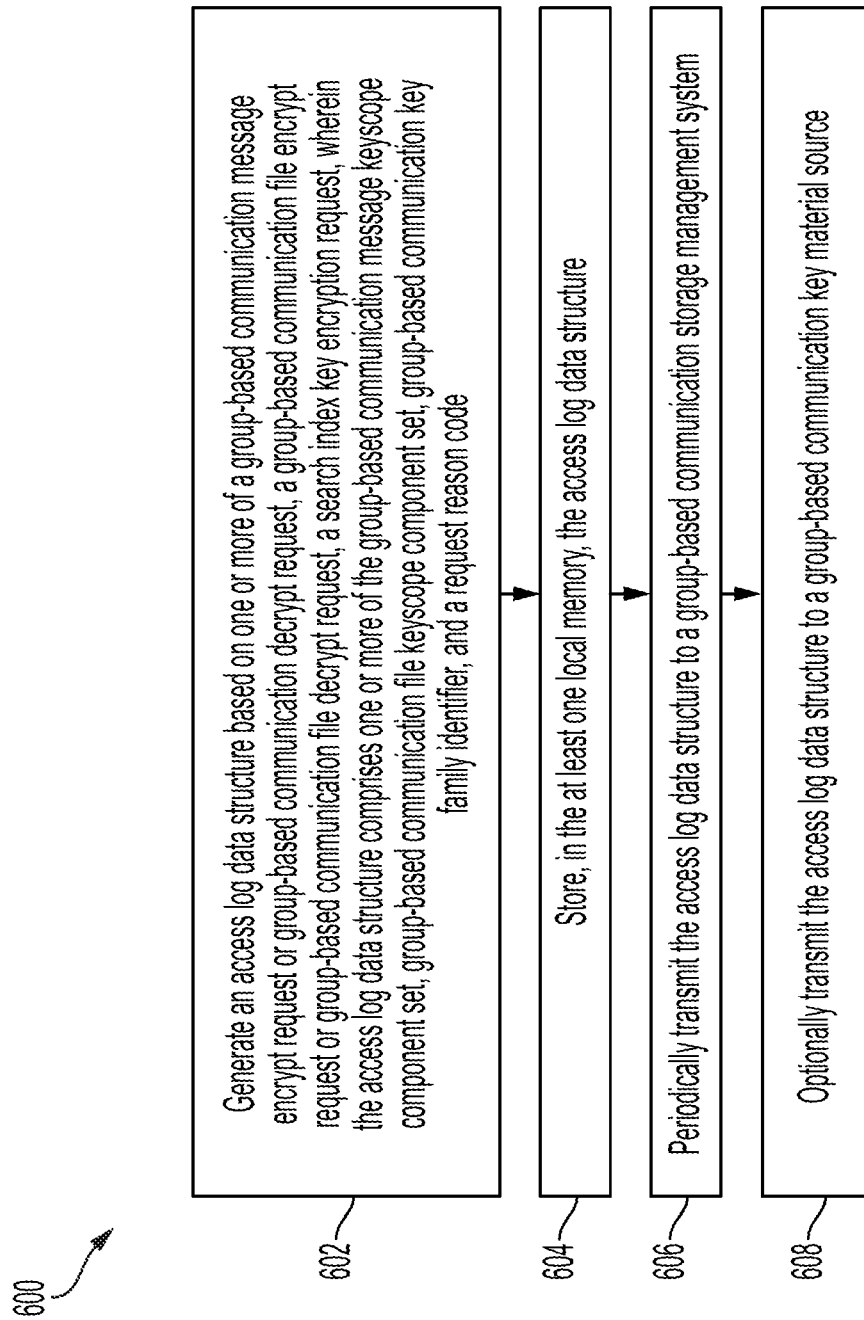
Figure 7A:
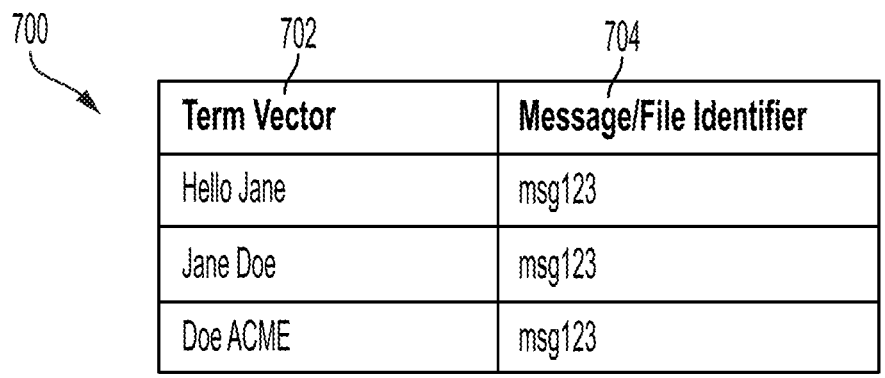
Figure 7B:
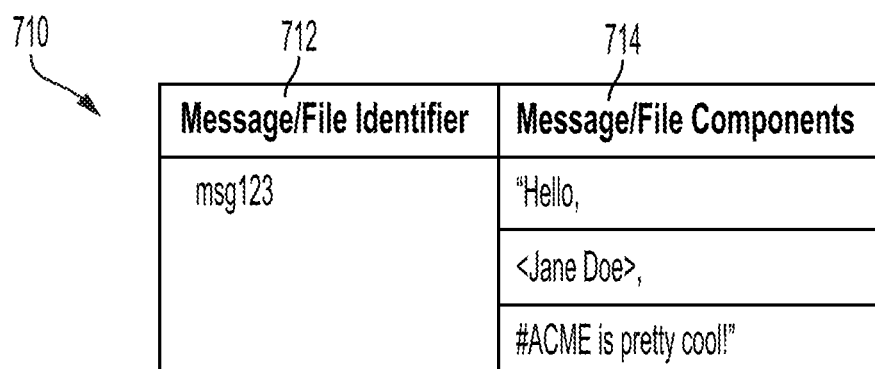
Figure 8A:
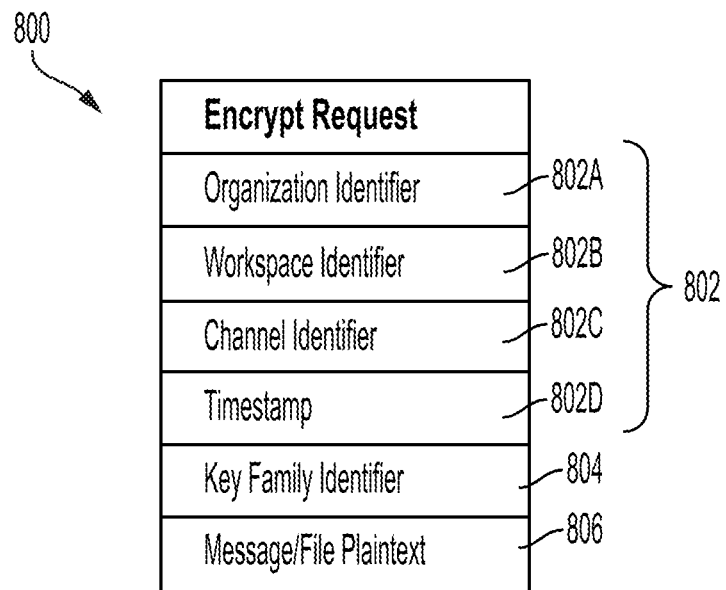
Figure 8B:
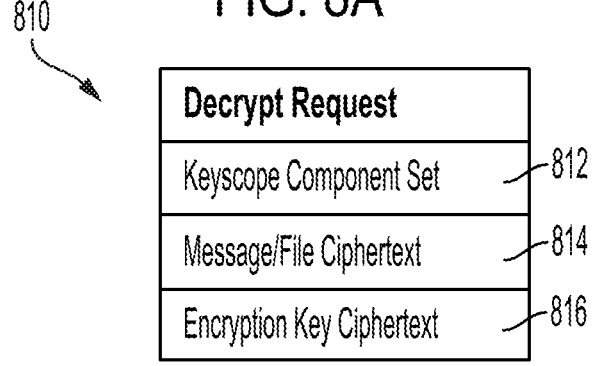
Figure 9:
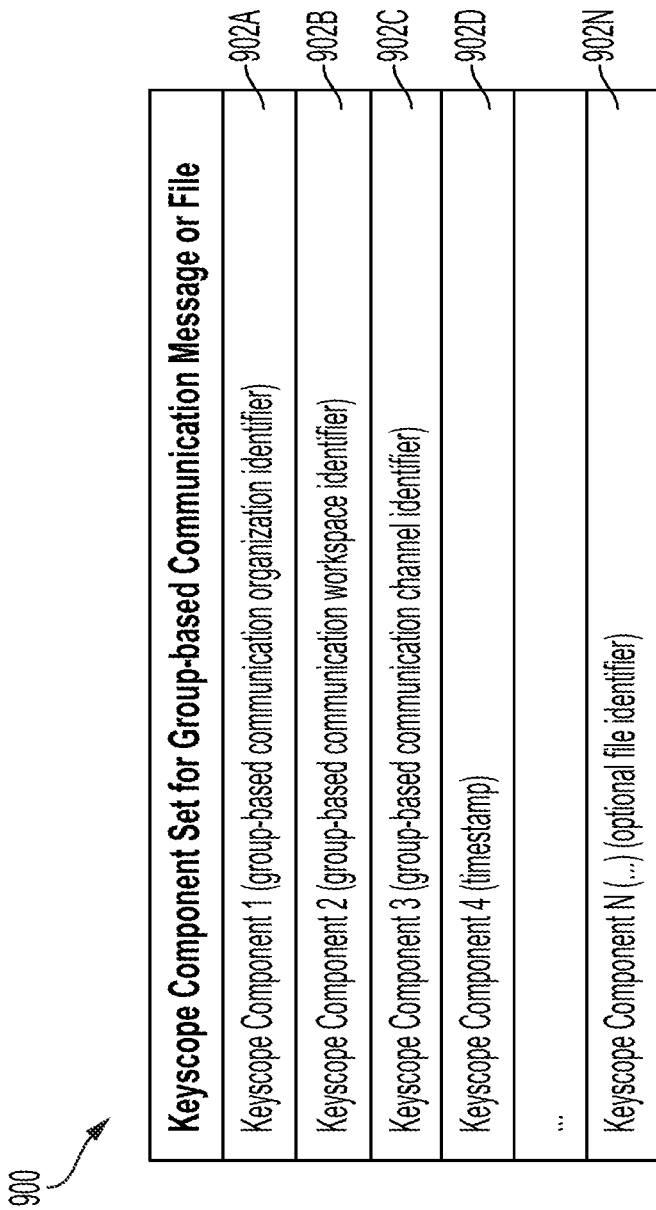
Figure 10A:
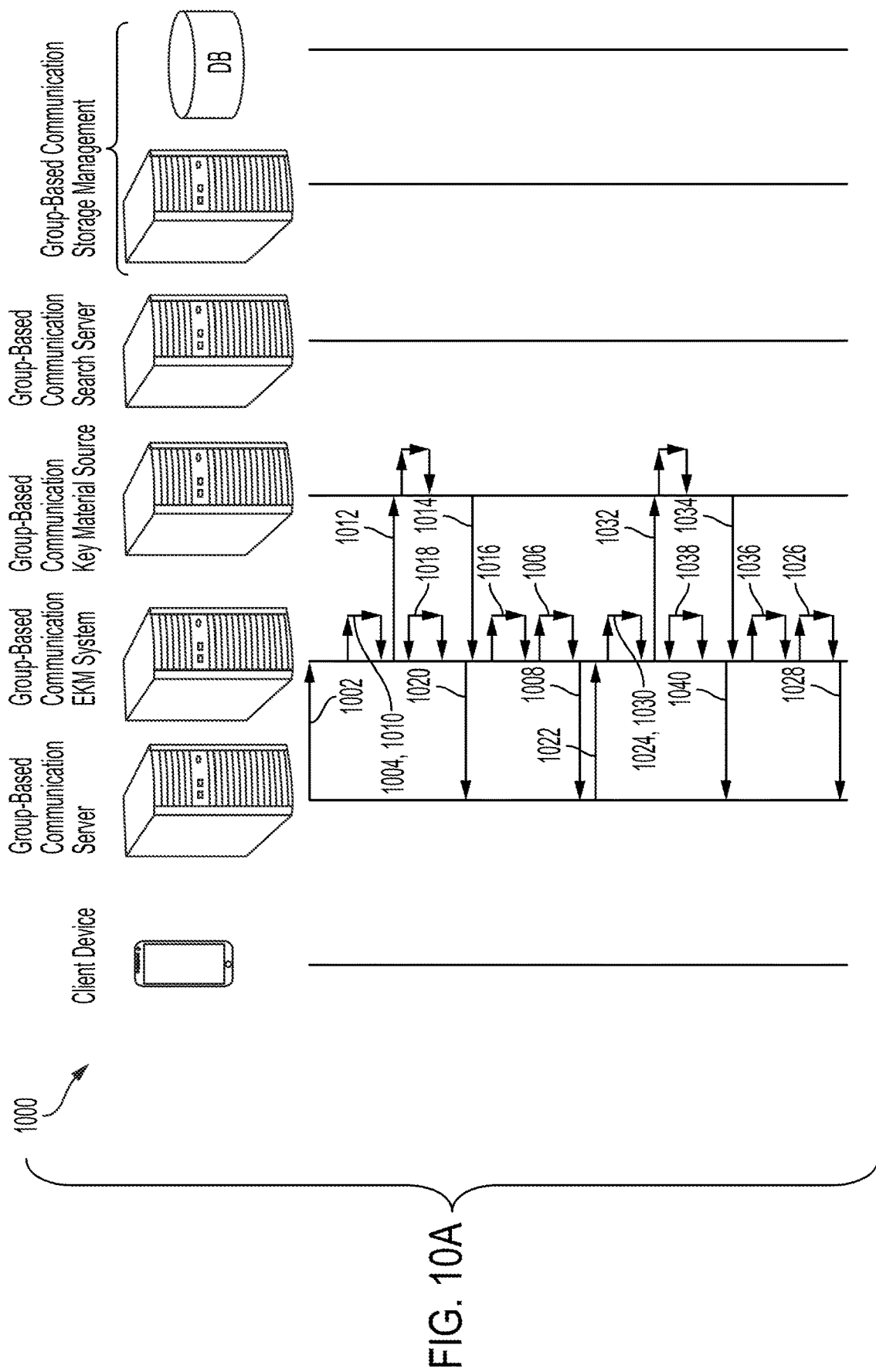
Figure 10C:
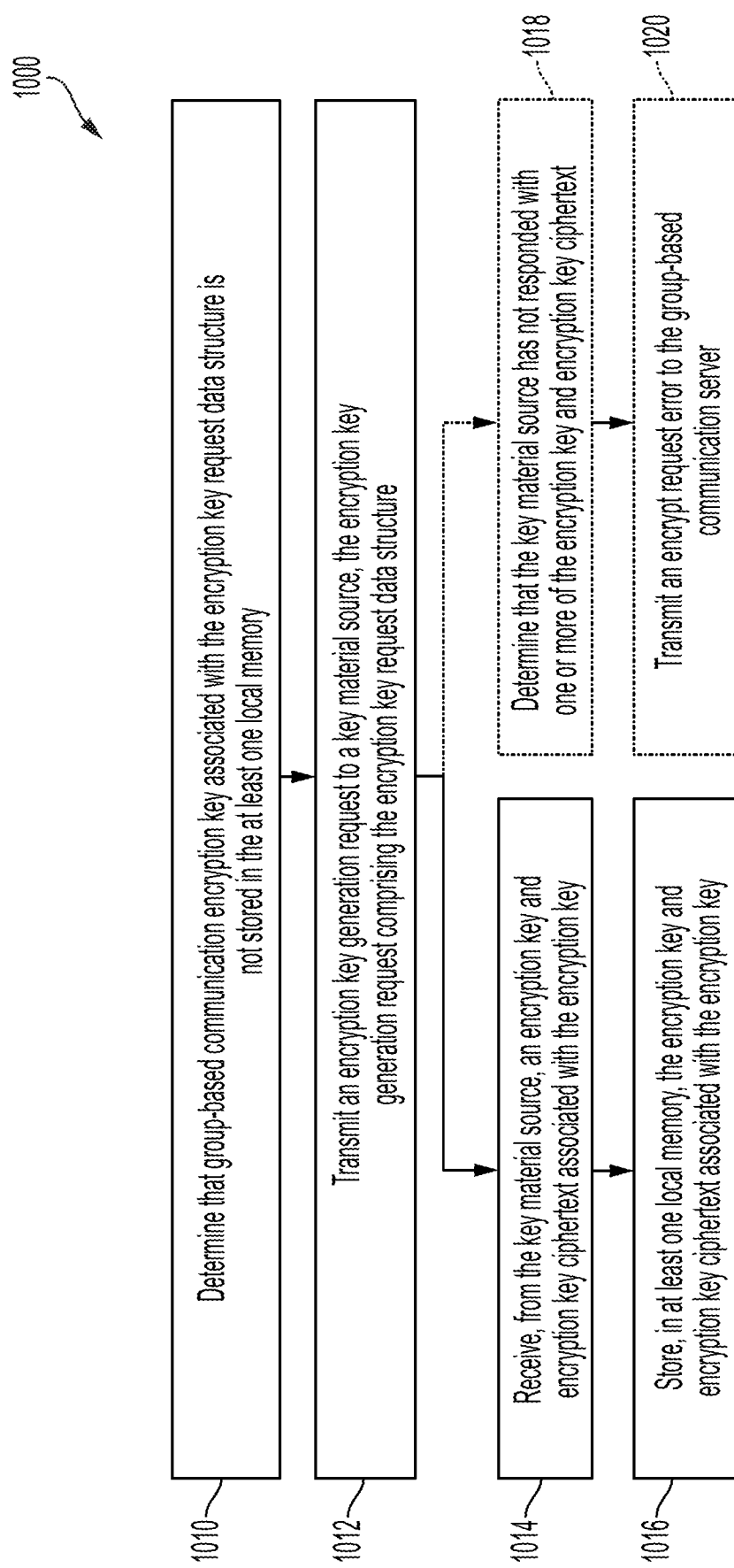
Figure 10C:
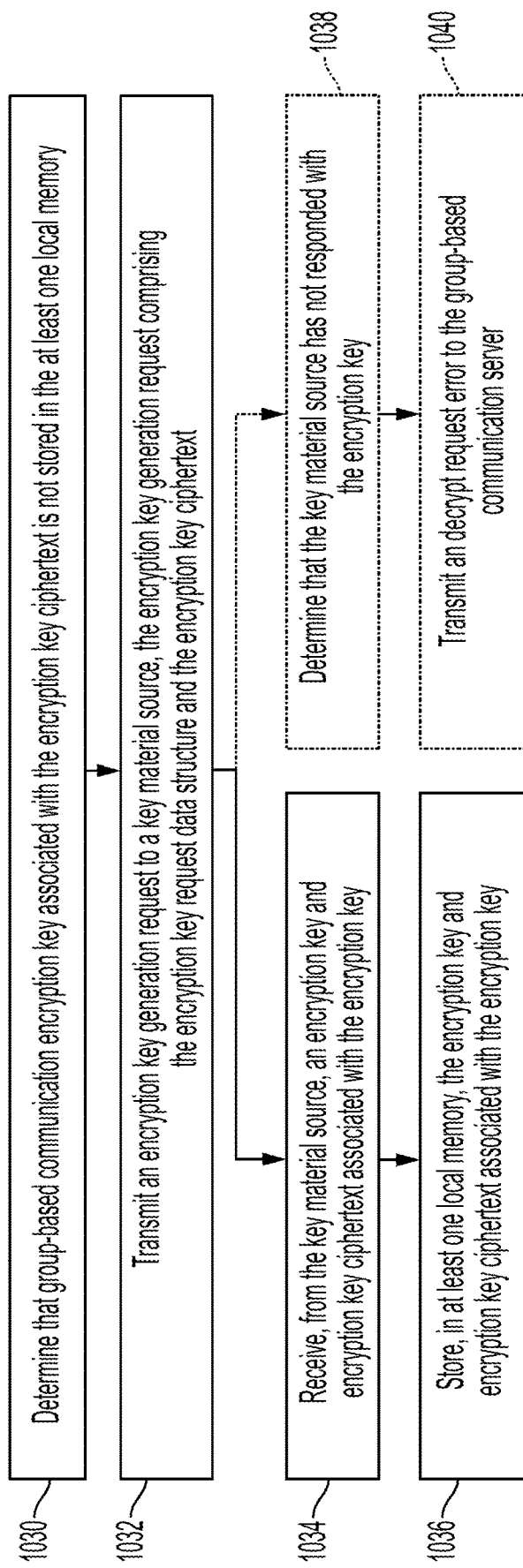
Figure 11B:
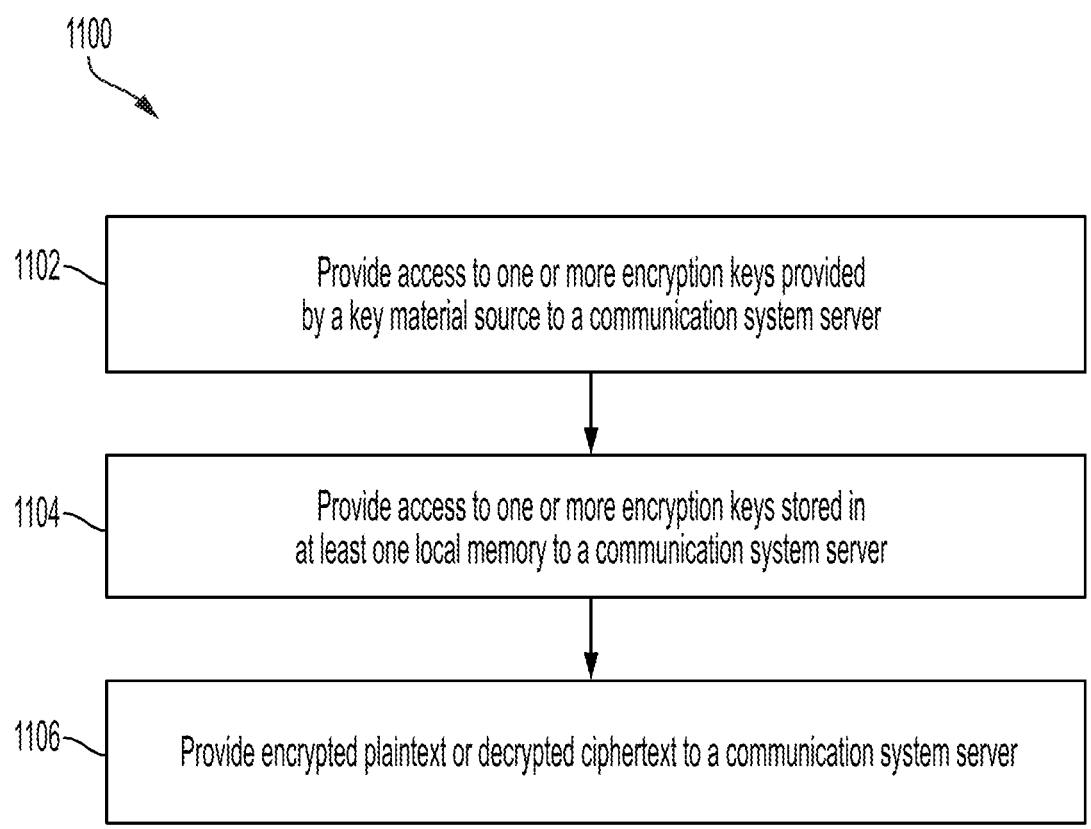

Having thus described the invention in general terms, reference will now be made to the accompanying drawings, which are not necessarily drawn to scale, and wherein:

FIG. 1 illustrates a system architecture diagram of an exemplary group based communication system configured to practice embodiments of the present disclosure;

FIG. 2A illustrates an exemplary schematic diagram of a computing entity according to embodiments of the present disclosure;

FIG. 2B illustrates an exemplary schematic diagram of a computing entity according to embodiments of the present disclosure;

FIG. 2C illustrates an exemplary schematic diagram of a computing entity according to embodiments of the present disclosure;

FIG. 2D illustrates an exemplary schematic diagram of a computing entity according to embodiments of the present disclosure;

FIG. 2E illustrates an exemplary schematic diagram of a computing entity according to embodiments of the present disclosure;

FIG. 3A illustrates an exemplary data flow for encrypting group-based communication messages, according to one embodiment of the present disclosure;

FIG. 3B illustrates an exemplary data flow for encrypting group-based communication messages, according to one embodiment of the present disclosure;

FIG. 3C illustrates an exemplary data flow for encrypting group-based communication messages, according to one embodiment of the present disclosure;

FIG. 3D illustrates an exemplary data flow for decrypting group-based communication messages according to one embodiment of the present disclosure;

FIG. 3E illustrates an exemplary data flow for decrypting group-based communication messages according to one embodiment of the present disclosure;

FIG. 3F illustrates an exemplary data flow for decrypting group-based communication messages according to one embodiment of the present disclosure;

FIG. 3G illustrates an exemplary data flow for encrypting group-based communication files, according to one embodiment of the present disclosure;

FIG. 3H illustrates an exemplary data flow for encrypting group-based communication files, according to one embodiment of the present disclosure;

FIG. 3I illustrates an exemplary data flow for encrypting group-based communication files, according to one embodiment of the present disclosure;

FIG. 3J illustrates an exemplary data flow for decrypting group-based communication files according to one embodiment of the present disclosure;

FIG. 3K illustrates an exemplary data flow for decrypting group-based communication files according to one embodiment of the present disclosure;

FIG. 3L illustrates an exemplary data flow for decrypting group-based communication files according to one embodiment of the present disclosure;

FIG. 4A illustrates an exemplary data flow for servicing group-based communication queries according to one embodiment of the present disclosure;

FIG. 4B illustrates an exemplary data flow for servicing group-based communication queries according to one embodiment of the present disclosure;

FIG. 4C illustrates an exemplary data flow for servicing group-based communication queries according to one embodiment of the present disclosure;

FIG. 5A illustrates an exemplary data flow for generating an encrypted group-based communication search index encryption key according to one embodiment of the present disclosure;

FIG. 5B illustrates an exemplary data flow for generating an encrypted group-based communication search index encryption key according to one embodiment of the present disclosure;

FIG. 5C illustrates an exemplary data flow for generating an encrypted group-based communication search index encryption key according to one embodiment of the present disclosure;

FIG. 6A illustrates an exemplary data flow for generating encryption key access logs according to one embodiment of the present disclosure;

FIG. 6B illustrates an exemplary data flow for generating encryption key access logs according to one embodiment of the present disclosure;

FIG. 7A illustrates exemplary data structures according to one embodiment of the present disclosure;

FIG. 7B illustrates exemplary data structures according to one embodiment of the present disclosure;

FIG. 8A illustrates an exemplary group-based communication encryption request data structure for use with embodiments of the present disclosure;

FIG. 8B illustrates an exemplary group-based communication decryption request data structure for use with embodiments of the present disclosure;

FIG. 9 illustrates an exemplary keyscope component set data structure according to one embodiment of the present disclosure;

FIG. 10A illustrates an exemplary data flow for providing encryption key management within a group-based communication system, according to one embodiment of the present disclosure;

FIG. 10B illustrates an exemplary data flow for providing encryption key management within a group-based communication system, according to one embodiment of the present disclosure;

FIG. 10C illustrates an exemplary data flow for providing encryption key management within a group-based communication system, according to one embodiment of the present disclosure;

FIG. 11A illustrates an exemplary data flow for providing encryption key management, according to embodiments of the present disclosure; and FIG. 11B illustrates an exemplary data flow for providing encryption key management, according to embodiments of the present disclosure.

DETAILED DESCRIPTION OF VARIOUS EMBODIMENTS

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Data security is important to those entities to whom data belongs. Such entities prefer to have their data encrypted by whomever may access and utilize the data to protect the security of their data. An example of such encryption is referred to as "zero-knowledge encryption," which means a service provider knows nothing about the data an entity stores on the service provider servers or repositories. While such encryption may be preferable to a third party entity (i.e., a third party data owner who owns the data) storing its data on the service provider servers or providers, such zero-knowledge encryption eliminates any meaningful use of the data by the service provider. Meaningful uses of the data may include search and machine learning. For example, meaningful uses of the data may include access to metadata for use in generating a search index such that authorized users of a service provided by the service provider may easily search for and receive results (comprising the data) to desired queries.

A solution to the above problem involves the use of encryption keys that are owned by the entity (i.e., third party) to whom the data belongs (i.e., "third party data owner"). Through the use of such encryption keys and control by the third party entity, a service provider may be granted access to the data and associated metadata to generate meaningful search indexes. However, providing control over access to group-based communication data to the third party, through the use of encryption keys, as well as logs of accesses to group-based communication data to that third party, becomes an unwieldy computational task as the amount and complexity of group-based communication data grows. The inventors of the present disclosure have identified that the computing resources utilized for such access control are easily exhausted as a result of such computational complexity.

The present disclosure provides centralization and encapsulation of access to third party controlled encryption keys. Through the use of a centralized key material source, embodiments of the present disclosure enable a third party data owner to retain exclusive control over encryption keys and therefore encryption and decryption of group-based communication data maintained by a group-based communication platform and owned by the third party data owner. The present disclosure enables automatic key rotation by encrypting and decrypting every group-based communication message using a combination of keyscope components (e.g., a timestamp) specifically and uniquely associated with the group-based communication message. As a result of the technological improvements provided by the present disclosure, efficient and secure control and detailed logging of access to group-based communication data is enabled.

The present disclosure provides granular control of access to third party owned data through the use of keyscope component sets comprising one or more unique keyscope components associated with a piece of data (i.e., message, file, search index). For example, a keyscope component set may comprise a plurality of keyscope components (e.g., an organization identifier, a channel identifier, a timestamp, and the like). In such an example, a third party data owner may wish to revoke access to data associated with a particular group-based communication channel. The present disclosure enables revocation of access to encryption keys associated with a keyscope component comprising the group-based communication channel identifier associated with the particular group-based communication channel, while continuing to enable access to other data owned by the third-party data owner. Such granularity improves efficiency in controlling access to data, and improves over existing systems that are "all-or-nothing" in that access to all data is either enabled or disabled through revocation of encryption key material.

Definitions

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party resource developer support that grants appropriate access to the data and allows third party resource developers (e.g., distinct from the third party data owners) to build applications and bots to integrate with customer's workflows. That is, a third party resource (e.g., "app") developer may require access to data owned by a third party that desires control over access to the data. Embodiments of the present disclosure enable the third party resource developer to access the data owned by the third party in a manner controlled by and visible to the third party data owner.

The term "communication channel" refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users, also referred to as channel members) for sharing group-based communication data among all users (members) of the group-based communication channel.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user" should be understood to refer to an individual, group of individuals, business, organization, and the like; the users referred to herein are accessing a group-based communication or messaging system using client devices. "Group-based" is used herein to refer to system, channel, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., j doe), a password, a real name, a time zone, a status, and the like. The user account details can include a subset designation of user credentials, such as, for example, login information for the user including the user's username and password.

The term "group-based communication channel" refers to a virtual communications environment or feed that is configured to display messaging communications or other group-based communication data posted by channel members (e.g., validated users accessing the environment using client devices) that are viewable only to the members of the group-based communication channel. The format of the group-based communication channel may appear differently to different members of the channel; however, the content of the group-based communication channel (i.e., messaging communications or other group-based communication data) will be displayed to each member of the channel (according to the member's access level). For instance, a common set of group-based messaging communications will be displayed to each member of the respective group-based communication channel such that the content of the group-based communication channel (i.e., messaging communications) will not vary per member of the channel.

As used herein, the terms "messaging communication," "message," and "group-based communication message" refer to any electronically generated digital content object provided by a user using a client device and that is configured for display within a group-based communication channel interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes "group-based communication message metadata" comprising the following: an organization identifier, a sending user identifier, a message identifier, message contents, a workspace identifier, a group identifier, and a group-based communication channel identifier. Each of the foregoing identifiers may comprise ASCII text, a pointer, a memory address, and the like.

Messages for display within a group-based communication channel interface are "replicated" across devices within the group-based communication channel, including client devices, gateway servers, and/or channel servers. Replication causes copies of at least a portion of each message (including message content and/or attachments) to be created in memories associated with each of the devices associated with a group-based communication channel. The replicated copies may be generated by transmitting the message (e.g., copies of the message) from a single device (e.g., a single client device and/or a single interface controller) to a plurality of devices (e.g., a plurality of client devices and/or a plurality of gateway servers). However, it should be understood that messages may be replicated by transmitting a message from a single device to a separate, single device, and this process may be repeated one or more times to replicate a message among a plurality of devices. In certain embodiments, message replication among a plurality of gateway servers and a single channel server enables messages to be shared with client devices within a common group-based communication channel that spans a plurality of gateway servers (e.g., each client device may communicate with a separate gateway server) and is supported by the single channel server. However, it should be understood that certain embodiments support channels via a single gateway server, and accordingly the single gateway server disseminates messages to the appropriate client devices in such configurations.

As used herein, the terms "file," and "group-based communication file" refer to any electronically generated digital content object provided by a user using a client device and that is configured for use within a group-based communication system. Files may include any text, image, video, audio, or combination thereof provided by a user (using a client device). For instance, the user may provide a file that includes text as well as an image and a video. Each file within the group-based communication system includes "group-based communication file metadata" comprising the following: an organization identifier, a creating user identifier, a file identifier, file contents (or file data), a workspace identifier, a group identifier, and a group-based communication channel identifier. Each of the foregoing identifiers may comprise ASCII text, a pointer, a memory address, and the like.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

A "sending user identifier" or "group-based communication message sender identifier" is associated with a collection of messages that are transmitted by a particular "sending" user (i.e., a client device associated with the particular user), such that the sending user identifier is one or more items of data by which the sending user may be uniquely identified. These messages may be analyzed to determine context regarding the user (e.g., the user's expertise or interest in a topic may be determined based on the frequency of mention of the topic or key words associated with the topic within such messages). A "sending user" associated with the "sending user identifier" may also be referred to herein as a "group-based communication message sender." That is, a "sending user identifier" or a "group-based communication message sender identifier" may be one or more items of data by which a "group-based communication message sender" may be uniquely identified.

Group-based communication system or platform users are organized into organization groups (e.g., employees of each company may be a separate organization group) and each organization group (i.e., group-based communication organization) may have one or more group-based communication channels to which users may be assigned or which the users may join (e.g., group-based communication channels may represent departments, geographic locations such as offices, product lines, user interests, topics, issues, and/or the like).

A "group-based communication organization identifier" refers to one or more items of data by which a group-based communication organization may be uniquely identified. A group-based communication organization identifier may be used to facilitate access control for a message or other content (e.g., access to the message, such as having the message return as part of search results in response to a search query, may be restricted to those users having the group-based communication organization identifier associated with their user profile). The group-based communication organization identifier may be used to determine context for the message (e.g., a description of the group, such as the name of an organization and/or a brief description of the organization, may be associated with the group identifier).

Group-based communication system users may also be organized into group-based communication workspaces. As such, communications transmitted by group-based communication system users may be associated with "group-based communication workspace identifiers." Group-based communication workspace identifiers comprise one or more items of data by which a group-based communication workspace may be uniquely identified. For example, a group-based communication organization identifier" may comprise ASCII text, a pointer, a memory address, and the like.

A group-based communication workspace may comprise a plurality of group-based communication channels organized among a plurality of group-based communication teams. A group-based communication organization may comprise multiple interconnected workspaces. In embodiments, group-based communication channels may be shared across group-based communication workspaces.

Group-based communication system users may join group-based communication channels. Some group-based communication channels may be globally accessible to those users having a particular organizational group identifier (e.g., group-based communication organization identifier) associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "group-based communication data" refers to electronic data structures representing settings, parameters, group-based communication channels, group-based communication organizations, electronic interactions with a group-based communication platform, group-based communication channel/organization/team members, group-based communication messages (latest messages, direct messages), files, and the like.

The terms "group-based communication encryption key management service" "group-based communication encryption key management system," and "group-based communication encryption key management server" refer to one or more computing entities configured for managing encryption and decryption of group-based communication message data and group-based communication search index encryption keys within a group-based communication platform. The terms "encryption key management server," "encryption key management system," and "encryption key management service" refer to one or more computing entities configured for managing encryption and decryption of data and encryption keys within a communication platform.

The term "group-based communication search server" refers to one or more computing entities configured to service group-based communication search queries as well as store encrypted group-based communication search index encryption keys and group-based communication search indexes.

The terms "group-based communication key material source server," "group-based communication key material source service," "group-based communication key material source," and "key material source" refer to one or more computing entities configured to support encryption and key management within a group-based communication or other communication platform. In embodiments, the group-based communication key material source server generates and maintains encryption keys for all group-based communication data stored within group-based communication repositories. In embodiments, the group-based communication key material source server provides encryption keys in response to encryption key requests received from a group-based communication encryption key management service. In embodiments, the group-based communication key material source service may be supported by AWS® KMS.

The terms "group-based communication storage management service," "group-based communication storage management server," and "group-based communication storage management service" refer to one or more computing entities configured to manage the storage of group-based communication data as well as the building of search indexes based upon the group-based communication data. The group-based communication storage management service may employ one or more group-based communication storage management repositories to facilitate these functions. For example, a first group-based communication storage management repository may store decrypted group-based communication data (i.e., plaintext) for use in generating a group-based communication search index. In embodiments, a second group-based communication storage management repository may store encrypted group-based communication data as well as encrypted group-based communication search index encryption keys.

The term "group-based communication key family identifier" refers to one or more items of data by which an encryption key family may be uniquely identified. An encryption key family may represent a grouping of encryption keys associated with a particular organization or group of users or computing devices, or an encryption key family may represent a type or encryption key and location of key material. In embodiments, a group-based communication encryption key material source organizes encryption keys for a particular organization or group of users or computing devices according to group-based communication key family identifiers. In embodiments, a third party controller of access to a group-based communication key material source may rotate an encryption key family for their data.

The term "encrypt request" refers to an electronic request for the encryption of data. More specifically, the request is for the transformation of data from plaintext to ciphertext based upon a cryptographic algorithm and using an encryption key. In embodiments, an encrypt request comprises an encryption key request data structure and encrypt request plaintext. In embodiments, an encrypt request can be a group-based communication message or file encrypt request, or an encrypt request can be a group-based communication search index encryption key encryption request.

The term "encrypt request error" refers to an electronic message transmitted by a group-based communication encryption key management server to a requesting server, the encrypt request error message indicating that access to a requested encryption key is denied.

The term "encapsulated access" refers to a capability provided by a group-based communication encryption key management server whereby access to encryption key material associated with data stored by a group-based communication system but owned by a third party data owner is controllable by the third party data owner. No encryption key material (e.g., encryption keys) associated with data owned by the third party data owner, and provided by a group-based communication key material source, is transmitted outside of the group-based communication encryption key management server in plaintext.

The term "decrypt request error" refers to an electronic message transmitted by a group-based communication encryption key management server to a requesting server, the decrypt request error message indicating that access to a requested encryption key is denied.

The term "channel history placeholder text" refers to data renderable within a group-based communication channel interface, where the data represents group-based communication data The term "encryption key request data structure" refers to a data structure having a plurality of records representing a scope of key material associated with an encrypt request. In embodiments, an encryption key request data structure can comprise one or more of a keyscope component set, a group-based communication organization identifier, and a group-based communication key family identifier.

The term "group-based communication message encrypt request" refers to an electronic request for the encryption of group-based communication message data. More specifically, the request is for the transformation of group-based communication message data from plaintext to ciphertext based upon a cryptographic algorithm and using an encryption key. In embodiments, a group-based communication message encrypt request comprises a group-based communication family key identifier, a group-based communication message keyscope component set and group-based communication plaintext.

The term "group-based communication message plaintext" refers to unencrypted group-based communication message data. In embodiments, group-based communication message plaintext is unencrypted information for input into a cryptographic algorithm.

The term "encrypt request plaintext" refers to unencrypted data. In embodiments, encrypt request plaintext is unencrypted information for input into a cryptographic algorithm.

The term "group-based communication message ciphertext" refers to encrypted group-based communication message data. In embodiments, group-based communication message ciphertext is encrypted information output from a cryptographic algorithm performed on a group-based communication message.

The term "decrypt request ciphertext" refers to encrypted data. In embodiments, decrypt request ciphertext is encrypted information output from a cryptographic algorithm performed on data.

The term "group-based communication file encrypt request" refers to an electronic request for the encryption of a group-based communication file. More specifically, the request is for the transformation of the file data from plaintext to ciphertext based upon a cryptographic algorithm and using an encryption key. In embodiments, a group-based communication file encrypt request comprises a group-based communication family key identifier, a group-based communication file keyscope component set, and group-based communication file plaintext.

The term "group-based communication file plaintext" refers to unencrypted group-based communication file data. In embodiments, group-based communication file plaintext is unencrypted information for input into a cryptographic algorithm.

The term "group-based communication file ciphertext" refers to encrypted group-based communication file data. In embodiments, group-based communication file ciphertext is encrypted information output from a cryptographic algorithm performed on a group-based communication file.

The term "group-based communication message keyscope component" refers to a record contained within a data structure representing a scope of an encryption key associated with a group-based communication message. In embodiments, a group-based communication message keyscope component is one of a group-based communication organization identifier, a group-based communication workspace identifier, a group-based communication channel identifier, and a timestamp. It will be appreciated that a group-based communication message keyscope component can be an arbitrary set of qualifiers not listed herein, along with a timestamp. It will be appreciated that the inclusion of a timestamp as a keyscope component provides built-in or automated key rotation. Access to a group-based communication message may be revoked based on one or more of the keyscope components associated therewith. For example, any group-based communication message encryption key associated with a given group-based communication channel identifier may be rendered invalid by a group-based communication key material source (per instruction from a third party data owner associated with the group-based communication file) and therefore unusable. Further, any group-based communication message encryption key associated with a given group-based communication organization identifier (or other group-based communication message keyscope component or combination of group-based communication message keyscope components) may be rendered invalid by a group-based communication key material source (per instruction from a third party data owner associated with the group-based communication file) and therefore unusable.

The term "group-based communication file keyscope component" refers to a record contained within a data structure representing the scope of an encryption key associated with a group-based communication file. In embodiments, a group-based communication file keyscope component is one of a group-based communication organization identifier, a group-based communication workspace identifier, a group-based communication channel identifier, a file identifier (e.g., one or more items of data by which the file may be uniquely identified), and a timestamp. Access to a group-based communication file may be revoked based on one or more of the keyscope components associated therewith. For example, any group-based communication file encryption key associated with a given group-based communication file identifier may be rendered invalid by a group-based communication key material source (per instruction from a third party data owner associated with the group-based communication file) and therefore unusable. Further, any group-based communication file encryption key associated with a given group-based communication organization identifier (or other group-based communication file keyscope component or combination of group-based communication file keyscope components) may be rendered invalid by a group-based communication key material source (per instruction from a third party data owner associated with the group-based communication file) and therefore unusable.

The term "group-based communication message keyscope component set" refers to a data structure containing a plurality of group-based communication message keyscope components associated with a group-based communication message.

The term "group-based communication file keyscope component set" refers to a data structure containing a plurality of group-based communication file keyscope components associated with a group-based communication file.

The term "encryption key" refers to a digital piece of information (e.g., data structure; one or more items of data; and the like) that determines the functional output of a cryptographic algorithm. An encryption key specifies the transformation of group-based communication data plaintext (or other plaintext) into group-based communication data ciphertext (or other ciphertext), and/or vice versa. An encryption key may also specify the transformation of a group-based communication search index encryption key into an encrypted group-based communication search index encryption key, and vice versa.

The term "group-based communication message encryption key" refers to an encryption key generated specifically for a group-based communication message. In embodiments, the group-based communication message encryption key is generated by a group-based communication key material source and is associated with a specific group-based communication message keyscope set and group-based communication key family identifier associated with a particular group-based communication message.

The term "group-based communication file encryption key" refers to an encryption key generated specifically for a group-based communication file. In embodiments, the group-based communication message encryption key is generated by a group-based communication key material source and is associated with a specific group-based communication file keyscope component set and group-based communication key family identifier associated with a particular group-based communication file.

The term "encryption key management cache persistence period" refers to a measure of network time with respect to a particular timestamp after which a local cache storing encryption keys should be refreshed. For example, an encryption key management cache persistence period may comprise a specific duration of network time and, upon completion of the specific duration of network time after a particular timestamp occurs, a local cache or memory storing encryption keys may be flushed or refreshed.

The term "access log data structure" refers to an electronic data structure representing group-based communication message encrypt requests, group-based communication message decrypt requests, group-based communication search index encryption key requests, group-based communication file encrypt requests, group-based communication file decrypt requests, and the like. In embodiments, an access log data structure comprises a group-based communication message or file identifier, a group-based communication message or file keyscope component set, a timestamp, a user identifier associated with the request, and a request reason code. In embodiments, an access log data structure comprises a group-based communication search index encryption key identifier and a request reason code.

The term "request reason code" refers to a record within an access log data structure representing a reason for a group-based communication message or file encrypt or decrypt request. The request reason code may also represent a reason for a group-based communication search index encryption key request. In embodiments, a request reason code may be one of:

discovery (for e-discovery or data loss prevention exercises);
history (fetching group-based communication messages/files (or group-based communication message/file metadata) to read/view)
export (exporting of group-based communication data)
learning-intelligence-training (utilizing group-based communication data to train machine learning models)
notifications (transmitting a notification to a client device (i.e. mobile device, desktop))
search-indexing (performing indexing so group-based communication data can be searched and retrieved later by users in a group-based communication system)
sending (writing a group-based communication message, file (i.e., post, snippet) or group-based communication message/file metadata; writing meaning transmission of a group-based communication message/file by a user within a group-based communication platform);
uploading (uploading a group-based communication message or file to a group-based communication storage management system or repository);
backfill (processing (i.e., encrypt, re-encrypt, decrypt) all group-based communication message and file data to respectively enroll, rekey, or unenroll from the encryption management system); and
search-querying (servicing search queries received from client devices within a group-based communication system).

The term "group-based communication message decrypt request" refers to an electronic request for the decryption of group-based communication message data. More specifically, the request is for the transformation of group-based communication message data from ciphertext to plaintext based upon a cryptographic algorithm and using an encryption key. In embodiments, a group-based communication message decrypt request comprises a group-based communication message keyscope component set, encryption key ciphertext (associated with a group-based communication message encryption key associated with the group-based communication message), and group-based communication message ciphertext.

The term "decrypt request" refers to an electronic request for the decryption of data. More specifically, the request is for the transformation of data from ciphertext to plaintext based upon a cryptographic algorithm and using an encryption key. In embodiments, decrypt request comprises an encrypt request data structure, encryption key ciphertext (associated with an encryption key), and decrypt request ciphertext. In embodiments, a decrypt request can be a group-based communication message or file decrypt request.

In embodiments, a decrypt request can be a request for a group-based communication search index encryption key.

The term "group-based communication file decrypt request" refers to an electronic request for the decryption of group-based communication file data. More specifically, the request is for the transformation of group-based communication file data from ciphertext to plaintext based upon a cryptographic algorithm and using an encryption key. In embodiments, a group-based communication file decrypt request comprises a group-based communication file keyscope component set, encryption key ciphertext (associated with a group-based communication file encryption key associated with the group-based communication file), and group-based communication file ciphertext.

The term "encryption key ciphertext" refers to encrypted encryption key data. In embodiments, encryption key ciphertext is encrypted information output from a cryptographic algorithm performed on an encryption key. For example, an encryption key received from a key material source may be provided as plaintext, and also accompanied by a ciphertext version of the encryption key (i.e., the encryption key ciphertext).

The term "encryption key generation request" refers to an electronic transmission to a group-based communication key material source for encryption keys to use for encryption or decryption of information (e.g., messages, files, search index keys) from a group-based communication encryption key management server. In embodiments, encryption key generation requests comprise one or more of group-based communication key family identifiers, encryption key ciphertext, and keyscope component sets comprising one or more of a group-based communication organization identifier, a group-based communication workspace identifier, a group-based communication channel identifier, a group-based communication user identifier, a file identifier, or a timestamp. It will be appreciated that the keyscope components used for association with encryption keys may vary according to different embodiments, with the exception of the timestamp remaining present. In other embodiments, a timestamp may not be a keyscope component.

The terms "group-based communication search index" and "search index" refer to a data structure that improves the speed of group-based communication data retrieval operations from a group-based communication repository. Search indexes are used to quickly locate data without having to search every row in a database table every time a database table is accessed. Indexes can be created using one or more columns of a database table, providing the basis for both rapid random lookups and efficient access of ordered records.

The term "group-based communication search index encryption key request" refers to an electronic request for the encryption or decryption of an encryption key associated with a group-based communication search index (e.g., a group-based communication search index encryption key). In embodiments, the group-based communication search index key encryption request comprises a search index encryption key (as plaintext in an encryption request, and as ciphertext or "encrypted search index encryption key" in a decryption request) and a group-based communication organization identifier. In embodiments, a search index encryption key is a random encryption key generated for encrypting a search index. In embodiments, the search index encryption key is generated by a group-based communication storage management system and transmitted to the group-based communication encryption key management service. In embodiments, the group-based communication search index key encryption request comprises an encrypted search index encryption key and a group-based communication organization identifier.

The term "group-based communication search query" refers to a query that a user of a group-based communication platform enters into a group-based communication interface, by using a computing device, to satisfy his or her information retrieval needs. The group-based communication search query comprises a query for group-based communication system information related to informational queries (i.e., messages, files, users, topics, and the like), navigational queries (i.e., group-based communication channels, workspaces, messages, and the like), and/or transactional queries.

The term "group-based communication search results" refers to a listing of results comprising group-based communication data returned in response to a group-based communication search query. In embodiments, group-based communication search results may comprise identifiers of group-based communication messages, files, and the like meeting search criteria of the group-based communication search query.

The term "group-based communication search index encryption key" refers to an encryption key generated specifically for the encryption of a particular group-based communication search index. In embodiments, the group-based communication search index encryption key is associated with a group-based communication organization identifier. As mentioned above, in embodiments, a group-based communication search index encryption key is generated by a group-based communication storage management system and transmitted to a group-based communication encryption management system for encryption through a group-based communication key material source. As a result of such generation of the group-based communication search index encryption key, no encryption keys generated through the use of the group-based communication key material source are transmitted outside of the group-based communication encryption management system.

The terms "encrypted group-based communication search index encryption key" or "encrypted search index encryption key" refer to an encrypted group-based communication search index encryption key, where the group-based communication search index encryption key is encrypted using an organization encryption key associated with a group-based communication organization identifier associated with a group-based communication search index encrypted by the group-based communication search index encryption key.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the enterprise group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The group-based communication system or platform 105 may further comprise one or more group-based communication search servers 108, a group-based communication encryption key management service 109 (or in embodiments, an encryption key management service), a group-based communication storage management service 110, and a group-based communication key material source server 111 (e.g., the group-based communication key material source server 111 may be controlled by a third party remote from the group-based communication system 105) (also, in embodiments, a key material source). The one or more group-based communication search servers 108, a group-based communication encryption key management service 109, a group-based communication storage management service 110, and a group-based communication key material source server 111 are configured to support, along with the group-based communication server 106 and group-based communication repository 107, secure encrypted communications and encryption key management as described herein.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like. In embodiments, client devices 101A-101N may also be computing devices that are not only under the direction of humans, but are actually under the control of a computing entity (i.e., a "bot"). It will also be appreciated that client devices 101A-101N may be embodied by third party resources such as third party applications. In such embodiments, applications and bots can share in the ecosystem of the group-based communication system.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., an enterprise group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53 </user_agent_string>
        <client_product_type>iPhone6,1</client_product_type>
        <client serial number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
```

```
        </client_details>
        <message>
            <message_identifier>ID_message_10</message_identifier>
            <team_identifier>ID_team_1</team_identified
            <channel_identifier>ID_channel_1</channel_identifier>
            <contents>That is an interesting invention. I have attached a copy our patent
policy.</contents>
            <attachments>patent_policy.pdf</attachments>
        </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a copy our
patent policy.</contents>
    <attachments>patent_policy.pdf</attachments>
    <conversation_primitive>
        conversation includes messages: ID_message_8,
        ID_message_9, ID_message_10, ID_message_11,
        ID_message_12
    </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following: SELECT messageResponses FROM MSM_Message WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the enterprise group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200 shown in FIG. 2A. The apparatus 200 may include a processor 202, a memory 201, input/output circuitry 203, communications circuitry 205, group-based communication repository 107 and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

The group-based communication search server 108 may be embodied by one or more computing systems, such as apparatus 210 shown in FIG. 2B. The apparatus 210 may include a processor 212, a memory 211, input/output circuitry 213, communications circuitry 215, and group-based communication search circuitry 214. The apparatus 210 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 210 may provide or supplement the functionality of particular circuitry. For example, the processor 212 may provide processing functionality, the memory 211 may provide storage functionality, the communications circuitry 215 may provide network interface functionality, and the like.

In some embodiments, the processor 212 (and/or co-processor or any other processing circuitry assisting or otherwise associated with the processor) may be in communication with the memory 211 via a bus for passing information among components of the apparatus. The memory 211 may be non-transitory and may include, for example, one or more volatile and/or non-volatile memories. In other words, for example, the memory may be an electronic storage device (e.g., a computer readable storage medium). The memory 211 may be configured to store information, data, content, applications, instructions, or the like, for enabling the apparatus to carry out various functions in accordance with example embodiments of the present disclosure.

The processor 212 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 212 may be configured to execute instructions stored in the memory 211 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 210 may include input/output circuitry 213 that may, in turn, be in communication with processor 212 to provide output to the user and, in some embodiments, to receive an indication of a user input. The input/output circuitry 213 may comprise a user interface and may include a display and may comprise a web user interface, a mobile application, a client device, a kiosk, or the like. In some embodiments, the input/output circuitry 213 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 211, and/or the like).

The communications circuitry 215 may be any means such as a device or circuitry embodied in either hardware or a combination of hardware and software that is configured to receive and/or transmit data from/to a network and/or any other device, circuitry, or module in communication with the apparatus 210. In this regard, the communications circuitry 215 may include, for example, a network interface for enabling communications with a wired or wireless communication network. For example, the communications circuitry 215 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication search circuitry 214 includes hardware configured for retrieval of search results within a group-based communication system. The group-based communication search circuitry 214 may utilize processing circuitry, such as the processor 212, to perform these actions. It should also be appreciated that, in some embodiments, the group-based communication search circuitry 214 may include a separate processor, specially configured field programmable gate array (FPGA), or application specific interface circuit (ASIC).

The group-based communication encryption key management service 109 (or encryption key management service) may be embodied by one or more computing systems, such as apparatus 220 shown in FIG. 2C. The apparatus 220 may include a processor 222, a memory 221, input/output circuitry 223, communications circuitry 225, and group-based communication encryption key management (or encryption key management) circuitry 224. The apparatus 220 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 220 may provide or supplement the functionality of particular circuitry. For example, the processor 222 may provide processing functionality, the memory 221 may provide storage functionality, the communications circuitry 225 may provide network interface functionality, and the like.

In some embodiments, the processor 222 (and/or co-processor or any other processing circuitry assisting or otherwise associated with the processor) may be in communication with the memory 221 via a bus for passing information among components of the apparatus. The memory 221 may be non-transitory and may include, for example, one or more volatile and/or non-volatile memories. In other words, for example, the memory may be an electronic storage device (e.g., a computer readable storage medium). The memory 221 may be configured to store information, data, content, applications, instructions, or the like, for enabling the apparatus to carry out various functions in accordance with example embodiments of the present disclosure.

The processor 222 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 222 may be configured to execute instructions stored in the memory 221 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 220 may include input/output circuitry 223 that may, in turn, be in communication with processor 222 to provide output to the user and, in some embodiments, to receive an indication of a user input. The input/output circuitry 223 may comprise a user interface and may include a display and may comprise a web user interface, a mobile application, a client device, a kiosk, or the like. In some embodiments, the input/output circuitry 223 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 221, and/or the like).

The communications circuitry 225 may be any means such as a device or circuitry embodied in either hardware or a combination of hardware and software that is configured to receive and/or transmit data from/to a network and/or any other device, circuitry, or module in communication with the apparatus 220. In this regard, the communications circuitry 225 may include, for example, a network interface for enabling communications with a wired or wireless communication network. For example, the communications circuitry 225 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication encryption key management circuitry 224 (or encryption key management service circuitry) includes hardware configured to support the management of encryption key requests, along with encryption and decryption of data, within a group-based communication system or other communication system. The group-based communication encryption key management circuitry 224 may utilize processing circuitry, such as the processor 222, to perform these actions. It should also be appreciated that, in some embodiments, the group-based communication encryption key management circuitry 224 may include a separate processor, specially configured field programmable gate array (FPGA), or application specific interface circuit (ASIC).

The group-based communication storage management service 110 may be embodied by one or more computing systems, such as apparatus 230 shown in FIG. 2D. The apparatus 230 may include a processor 232, a memory 231, input/output circuitry 233, communications circuitry 235, group-based communication storage management circuitry 234, a first group-based communication storage management repository 237, and a second group-based communication storage management repository 238. The apparatus 230 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 230 may provide or supplement the functionality of particular circuitry. For example, the processor 232 may provide processing functionality, the memory 231 may provide storage functionality, the communications circuitry 235 may provide network interface functionality, and the like.

In some embodiments, the processor 232 (and/or co-processor or any other processing circuitry assisting or otherwise associated with the processor) may be in communication with the memory 231 via a bus for passing information among components of the apparatus. The memory 231 may be non-transitory and may include, for example, one or more volatile and/or non-volatile memories. In other words, for example, the memory may be an electronic storage device (e.g., a computer readable storage medium). The memory 231 may be configured to store information, data, content, applications, instructions, or the like, for enabling the apparatus to carry out various functions in accordance with example embodiments of the present disclosure.

The processor 232 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 232 may be configured to execute instructions stored in the memory 231 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 230 may include input/output circuitry 233 that may, in turn, be in communication with processor 232 to provide output to the user and, in some embodiments, to receive an indication of a user input. The input/output circuitry 233 may comprise a user interface and may include a display and may comprise a web user interface, a mobile application, a client device, a kiosk, or the like. In some embodiments, the input/output circuitry 233 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 231, and/or the like).

The communications circuitry 235 may be any means such as a device or circuitry embodied in either hardware or a combination of hardware and software that is configured to receive and/or transmit data from/to a network and/or any other device, circuitry, or module in communication with the apparatus 230. In this regard, the communications circuitry 235 may include, for example, a network interface for enabling communications with a wired or wireless communication network. For example, the communications circuitry 235 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication storage management circuitry 234 includes hardware configured to support the management of storage of group-based communication data communicated within a group-based communication system. The group-based communication storage management circuitry 234 may utilize processing circuitry, such as the processor 232, to perform these actions. It should also be appreciated that, in some embodiments, the group-based communication storage management circuitry 234 may include a separate processor, specially configured field programmable gate array (FPGA), or application specific interface circuit (ASIC).

The first group-based communication storage management repository 237 comprises one or more non-transitory storage media for creation of group-based communication system search indexes. During the creation of a group-based communication search indexes, group-based communication storage management circuitry 234 along with the first group-based communication storage management repository 237 create a search index encryption key for encrypting a search index prior to storing the encrypted search index in the second group-based communication storage repository 238. That is, the second group-based communication storage management repository 238 comprises one or more non-transitory storage media for storage of encrypted search indexes.

The group-based communication key material source 111 (or key material source) may be embodied by one or more computing systems, such as apparatus 240 shown in FIG.

2E. The apparatus 240 may include a processor 242, a memory 241, input/output circuitry 243, communications circuitry 245, and group-based communication key material source (or key material source) circuitry 244, and a group-based communication key material source repository 247. The apparatus 240 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 240 may provide or supplement the functionality of particular circuitry. For example, the processor 242 may provide processing functionality, the memory 241 may provide storage functionality, the communications circuitry 245 may provide network interface functionality, and the like.

In some embodiments, the processor 242 (and/or co-processor or any other processing circuitry assisting or otherwise associated with the processor) may be in communication with the memory 241 via a bus for passing information among components of the apparatus. The memory 241 may be non-transitory and may include, for example, one or more volatile and/or non-volatile memories. In other words, for example, the memory may be an electronic storage device (e.g., a computer readable storage medium). The memory 241 may be configured to store information, data, content, applications, instructions, or the like, for enabling the apparatus to carry out various functions in accordance with example embodiments of the present disclosure.

The processor 242 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 242 may be configured to execute instructions stored in the memory 241 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 240 may include input/output circuitry 243 that may, in turn, be in communication with processor 242 to provide output to the user and, in some embodiments, to receive an indication of a user input. The input/output circuitry 243 may comprise a user interface and may include a display and may comprise a web user interface, a mobile application, a client device, a kiosk, or the like. In some embodiments, the input/output circuitry 243 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 241, and/or the like).

The communications circuitry 245 may be any means such as a device or circuitry embodied in either hardware or a combination of hardware and software that is configured to receive and/or transmit data from/to a network and/or any other device, circuitry, or module in communication with the apparatus 240. In this regard, the communications circuitry 245 may include, for example, a network interface for enabling communications with a wired or wireless communication network. For example, the communications circuitry 245 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication key material source (or key material source) circuitry 244 includes hardware configured to support, in combination with group-based communication key material source repository 247, storage and management of encryption key materials and the servicing of requests for encryption key materials (e.g., generation of encryption keys to be associated with specific keyscope component sets associated with group-based communication messages or files for which the encryption keys will be used). The group-based communication key material source circuitry 244 may utilize processing circuitry, such as the processor 242, to perform these actions. It should also be appreciated that, in some embodiments, the group-based communication key material source circuitry 244 may include a separate processor, specially configured field programmable gate array (FPGA), or application specific interface circuit (ASIC). In embodiments, the group-based communication key material source repository stores encryption keys for the group-based communication platform as well as logs of requests for and uses of encryption keys by the group-based communication platform.

Example Processes for Encryption Key Management

FIGS. 3A, 3B, and 3C illustrate an exemplary data flow for encrypting group-based communication messages, according to one embodiment of the present disclosure. In embodiments, routine 300 begins in block 302 with a group-based communication encryption key management server receiving, using a processor and from a group-based communication server, a group-based communication message encrypt request. In embodiments, the group-based communication message encrypt request comprises a group-based communication key family identifier, a group-based communication message keyscope component set and group-based communication message plaintext.

In block 304, routine 300 continues with the group-based communication encryption key management server retrieving, from at least one local memory, a group-based communication message encryption key associated with the group-based communication message keyscope component set and the group-based communication key family identifier.

In block 306, routine 300 continues with the group-based communication encryption key management server encrypting, using the processor, the group-based communication message plaintext using the group-based communication message encryption key.

In block 308, routine 300 continues with the group-based communication encryption key management server determining that a group-based communication message encryption key associated with the group-based communication message keyscope component set and group-based communication key family identifier is not stored in at least one local memory. It will be appreciated that blocks 310, 312, and 314 are included in routine 300 when it is determined that a group-based communication message encryption key is not stored in the at least one local memory.

In block 310, routine 300 continues with the group-based communication encryption key management server transmitting, using the processor, an encryption key generation request to a group-based communication key material source. In embodiments, the encryption key generation request comprises the group-based communication keyscope component set and the group-based communication key family identifier.

In block 312, routine 300 continues with the group-based communication encryption key management server receiving, using the processor and from the group-based communication key material source, the group-based communication message encryption key and encryption key ciphertext associated with the group-based communication message encryption key.

In block 314, routine 300 continues with the group-based communication encryption key management server storing, using the processor and in at least one local memory, the group-based communication message encryption key and the encryption key ciphertext associated with the group-based communication message encryption key. In embodiments, the group-based communication encryption key and the encryption key ciphertext are associated, in the at least one local memory, with the group-based communication keyscope component set and the group-based communication key family identifier.

In block 316, routine 300 continues with the group-based communication encryption key management server transmitting, using the processor and to the group-based communication server, the group-based communication message ciphertext, the encryption key ciphertext, the group-based communication message keyscope component set, and the group-based communication key family identifier. In embodiments, the group-based communication server stores 318 the group-based communication message ciphertext, the group-based communication message keyscope component set, the group-based communication key family identifier, and the encryption key ciphertext in a group-based communication repository.

In embodiments, a group-based communication server receives 301A a group-based communication message from a client device and extracts 301B group-based communication message metadata from the group-based communication message prior to transmitting (302) the group-based communication message encrypt request to the group-based communication encryption management server.

In embodiments, upon expiration of an encryption key management cache persistence period after the timestamp, the group-based communication encryption key management server removes, from the at least one memory, the group-based communication message encryption key and the encryption key ciphertext associated with the group-based communication message encryption key.

In embodiments, access to the group-based communication key material source is controlled by a third party data owner.

FIGS. 3C, 3D, and 3F illustrate an exemplary data flow for decrypting group-based communication messages according to one embodiment of the present disclosure.

In block 322, routine 320 begins with the group-based communication encryption management server receiving, using a processor and from a group-based communication server, a group-based communication message decrypt request. In embodiments, the group-based communication message decrypt request comprises a group-based communication message keyscope component set, a group-based communication key family identifier, encryption key ciphertext, and group-based communication message ciphertext.

In block 324, routine 320 continues with the group-based communication encryption key management server retrieving a group-based communication message encryption key associated with the encryption key ciphertext from at least one local memory.

In block 326, routine 320 continues with the group-based communication encryption key management server decrypting, using the processor, the group-based communication message ciphertext using the group-based communication message encryption key to produce group-based communication message plaintext.

In block 330, routine 320 continues with the group-based communication encryption key management server determining that a group-based communication message encryption key associated with the encryption key ciphertext is not stored in at least one local memory.

In block 332, routine 320 continues with the group-based communication encryption key management server transmitting, using the processor, an encryption key generation request to a group-based communication key material source. In embodiments, the encryption key generation request comprising the group-based communication message keyscope component set, the group-based communication family identifier, and the encryption key ciphertext.

In block 334, routine 320 continues with the group-based communication encryption key management server receiving, using the processor and from the group-based communication key material source, the group-based communication message encryption key.

In block 336, routine 320 continues with the group-based communication encryption key management server storing, using the processor and in at least one local memory, the group-based communication message encryption key. It will be appreciated that blocks 330, 332, 334, and 336 are included in routine 320 when it is determined that an organization encryption key is not stored in the at least one local memory.

In block 328, routine 320 continues with the group-based communication encryption key management server transmitting, using the processor and to the group-based communication server, the group-based communication message plaintext. In embodiments, the group-based communication server transmits 342A the group-based communication message plaintext to a client device. In embodiments, the group-based communication server transmits 342B the group-based communication message plaintext to a group-based communication storage management service for use in generating a search index.

FIGS. 3G, 3H, and 3I illustrate an exemplary data flow for encrypting group-based communication files, according to one embodiment of the present disclosure. In embodiments, routine 350 begins in block 352 with a group-based communication encryption key management server receiving, using a processor and from a group-based communication server, a group-based communication file encrypt request. In embodiments, the group-based communication file encrypt request comprises a group-based communication key family identifier, a group-based communication file keyscope component set and group-based communication file plaintext.

In block 354, routine 350 continues with the group-based communication encryption key management server retrieving, from at least one local memory, a group-based communication file encryption key associated with the group-based communication file keyscope component set and the group-based communication key family identifier.

In block 356, routine 350 continues with the group-based communication encryption key management server encrypting, using the processor, the group-based communication file plaintext using the group-based communication file encryption key.

In block 358, routine 350 continues with the group-based communication encryption key management server determining that a group-based communication file encryption key associated with the group-based communication file keyscope component set and group-based communication key family identifier is not stored in at least one local memory. It will be appreciated that blocks 360, 362, and 364 are included in routine 350 when it is determined that a group-based communication file encryption key is not stored in the at least one local memory.

In block 360, routine 350 continues with the group-based communication encryption key management server transmitting, using the processor, an encryption key generation request to a group-based communication key material source. In embodiments, the encryption key generation request comprises the group-based communication keyscope component set and the group-based communication key family identifier.

In block 362, routine 350 continues with the group-based communication encryption key management server receiving, using the processor and from the group-based communication key material source, the group-based communication file encryption key and encryption key ciphertext associated with the group-based communication file encryption key.

In block 364, routine 350 continues with the group-based communication encryption key management server storing, using the processor and in at least one local memory, the group-based communication file encryption key and the encryption key ciphertext associated with the group-based communication file encryption key. In embodiments, the group-based communication encryption key and the encryption key ciphertext are associated, in the at least one local memory, with the group-based communication keyscope component set and the group-based communication key family identifier.

In block 366, routine 350 continues with the group-based communication encryption key management server transmitting, using the processor and to the group-based communication server, the group-based communication file ciphertext, the encryption key ciphertext, the group-based communication file keyscope component set, and the group-based communication key family identifier. In embodiments, the group-based communication server stores 318 the group-based communication file ciphertext, the group-based communication file keyscope component set, the group-based communication key family identifier, and the encryption key ciphertext in a group-based communication repository.

In embodiments, a group-based communication server receives 351A a group-based communication file from a client device and extracts 351B group-based communication file metadata from the group-based communication file prior to transmitting (352) the group-based communication file encrypt request to the group-based communication encryption management server.

In embodiments, upon expiration of an encryption key management cache persistence period after the timestamp, the group-based communication encryption key management server removes, from the at least one memory, the group-based communication file encryption key and the encryption key ciphertext associated with the group-based communication file encryption key.

In embodiments, access to the group-based communication key material source is controlled by a third party data owner.

FIGS. 3J, 3K, and 3L illustrate an exemplary data flow for decrypting group-based communication files according to one embodiment of the present disclosure.

In block 372, routine 370 begins with the group-based communication encryption management server receiving, using a processor and from a group-based communication server, a group-based communication file decrypt request. In embodiments, the group-based communication file decrypt request comprises a group-based communication file keyscope component set, a group-based communication key family identifier, encryption key ciphertext, and group-based communication file ciphertext.

In block 374, routine 370 continues with the group-based communication encryption key management server retrieving a group-based communication file encryption key associated with the encryption key ciphertext from at least one local memory.

In block 376, routine 370 continues with the group-based communication encryption key management server decrypting, using the processor, the group-based communication file ciphertext using the group-based communication file encryption key to produce group-based communication file plaintext.

In block 380, routine 370 continues with the group-based communication encryption key management server determining that a group-based communication file encryption key associated with the encryption key ciphertext is not stored in at least one local memory.

In block 382, routine 370 continues with the group-based communication encryption key management server transmitting, using the processor, an encryption key generation request to a group-based communication key material source. In embodiments, the encryption key generation request comprising the group-based communication file keyscope component set, the group-based communication family identifier, and the encryption key ciphertext.

In block 384, routine 370 continues with the group-based communication encryption key management server receiving, using the processor and from the group-based communication key material source, the group-based communication file encryption key.

In block 386, routine 370 continues with the group-based communication encryption key management server storing, using the processor and in at least one local memory, the group-based communication file encryption key. It will be appreciated that blocks 380, 382, 384, and 386 are included in routine 370 when it is determined that a group-based communication file encryption key is not stored in the at least one local memory.

In block 378, routine 370 continues with the group-based communication encryption key management server transmitting, using the processor and to the group-based communication server, the group-based communication file plaintext. In embodiments, the group-based communication server transmits 392A the group-based communication file plaintext to a client device. In embodiments, the group-based communication server transmits 392B the group-based communication file plaintext to a group-based communication storage management service for use in generating a search index.

FIGS. 4A, 4B, and 4C illustrate an exemplary data flow for servicing group-based communication queries according to one embodiment of the present disclosure.

In block 402, routine 400 begins with a group-based communication encryption key management server receiving, using a processor and from a group-based communication search server, a group-based communication search index encryption key request. In embodiments, the group-based communication search index encryption key request comprises an encrypted search index key and a group-based communication search index identifier.

In block 404, routine 400 continues with the group-based communication encryption key management server retrieving an organization encryption key associated with the group-based communication search index identifier from at least one local memory.

In block 406, routine 400 continues with the group-based communication encryption key management server decrypting, using the processor, the encrypted search index encryption key using the organization encryption key to produce a decrypted group-based communication search index encryption key.

In block 408, routine 400 continues with the group-based communication encryption key management server determining that an organization encryption key associated with the group-based communication search index identifier is not stored in at least one local memory.

In block 410, routine 400 continues with the group-based communication encryption key management server transmitting, using the processor and to a group-based communication key material source, an encryption key generation request. In embodiments, the encryption key generation request comprises a group-based communication organization identifier.

In block 412, routine 400 continues with the group-based communication encryption key management server receiving, using the processor and from the group-based communication key material source, an organization encryption key.

In block 414, routine 400 continues with the group-based communication encryption key management server storing, using the processor, the organization encryption key in at least one local memory. It will be appreciated that blocks 408, 410, 412, and 416 are included in routine 400 when it is determined that an organization encryption key is not stored in the at least one local memory.

In block 416, routine 400 continues with the group-based communication encryption key management server transmitting, using the processor and to the group-based communication search server, the decrypted group-based communication search index encryption key.

In embodiments, prior to transmitting (402) the group-based communication search index encryption key request to the group-based communication encryption key management server, a group-based communication server receives 401A a group-based communication search query from a client device before transmitting 401B a group-based communication search query to a group-based communication search server. The group-based communication server determines 401C that a group-based communication search index is required for servicing the group-based communication search query.

In embodiments, the group-based communication search server responds 418A to the group-based communication server with a list of identifiers of group-based communication data items that satisfy the desired search query. In embodiments, the group-based communication server must then retrieve 418B, 418C those group-based communication data items (e.g., group-based communication messages, files, objects, and the like) identified in the list of identifiers returned from the group-based communication search server from a group-based communication repository. It will be appreciated that the group-based communication data items retrieved from the group-based communication search server are encrypted and therefore must each be processed 418D through a decryption process (e.g., such as the exemplary decryption process depicted in FIGS. 3C, 3D, and 3E herein) before the group-based communication server responds 418E by transmitting search results to the client device.

FIGS. 5A and 5B illustrate an exemplary data flow for generating an encrypted group-based communication search index encryption key according to one embodiment of the present disclosure.

In block 502, routine 500 begins with the group-based communication encryption key management server receiving, using a processor and from a group-based communication search server, a group-based communication search index encryption key. In embodiments, the group-based communication search index encryption key is associated with a group-based communication organization identifier.

In block 504, routine 500 continues with the group-based communication encryption key management server retrieving an organization encryption key associated with the group-based communication organization identifier from at least one local memory.

In block 506, routine 500 continues with the group-based communication encryption key management server encrypting, using the processor, the group-based communication message search index encryption key using the organization encryption key to produce an encrypted group-based communication search index encryption key.

In block 508, routine 500 continues with the group-based communication encryption key management server determining that an organization encryption key associated with the group-based communication organization identifier is not stored in at least one local memory.

In block 510, routine 500 continues with the group-based communication encryption key management server transmitting, using the processor, an encryption key generation request to a group-based communication key material source. In embodiments, the encryption key generation request comprises the group-based communication organization identifier.

In block 512, routine 500 continues with the group-based communication encryption key management server receiving, using the processor and from the group-based communication key material source, the organization encryption key.

In block 514, routine 500 continues with the group-based communication encryption key management server storing, using the processor and in at least one local memory, the organization encryption key. It will be appreciated that blocks 508, 510, 512, and 516 are included in routine 500 when it is determined that an organization encryption key is not stored in the at least one local memory.

In block 516, routine 500 continues with the group-based communication encryption key management server transmitting, using the processor and to the group-based communication search server, the encrypted group-based communication search index encryption key.

In embodiments, the group-based communication search index encryption key is generated 501A by a group-based communication storage management service and transmitted 501B to the group-based communication search server.

FIGS. 6A and 6B illustrate an exemplary data flow for generating encryption key access logs according to one embodiment of the present disclosure.

In block 602, routine 600 begins with the group-based communication encryption management server generating, using the processor, an access log data structure representing one or more of a group-based communication message encrypt request or a group-based communication message decrypt request, a group-based communication file encrypt request or a group-based communication file decrypt request, or a group-based communication search index encryption key request. In embodiments, the access log data structure comprises one or more of the group-based communication message keyscope component set, the group-based communication file keyscope component set, a group-based communication organization identifier, a group-based communication key family identifier, and a request reason code.

In block 604, routine 600 continues with the group-based communication encryption key management server storing, using the processor and in the at least one memory, the access log data structure. Routine 600 further continues with the group-based communication encryption key management server periodically transmitting 606 a plurality of access log data structures (i.e., in a batch) to a group-based communication repository of a group-based communication storage management system. It will be appreciated that steps 602-604 are repeated throughout the performance of the group-based communication platform and group-based communication encryption key management service. It will also be appreciated that batches of access log data structures can be periodically transmitted 608 from the group-based communication encryption system to the group-based communication key material service server.

FIGS. 7A and 7B illustrate exemplary data structures according to one embodiment of the present disclosure. In embodiments, a data structure 700 associates a message or file identifier 704 in a group-based communication search index with a plurality of term vectors 702. In embodiments, another data structure 710 associates a message or file identifier 712 with a plurality of message or file components 714 in a group-based communication repository.

FIGS. 8A and 8B illustrate an exemplary group-based communication encryption request data structure and an exemplary group-based communication decryption request data structure for use with embodiments of the present disclosure. In embodiments, an exemplary group-based communication encryption request (e.g., group-based communication message encrypt request or a group-based communication file encrypt request) data structure 800 comprises a keyscope component set 802. The exemplary group-based communication encryption request data structure further comprises group-based communication message or file plaintext 806. In embodiments, keyscope component set 802 comprises one or more keyscope components 802A, 802B, 802C, 802D. It will be appreciated that, while keyscope component set 802 in FIG. 8A depicts a plurality of keyscope components (also referred to herein as group-based communication keyscope components), the present embodiments do not require more than a single keyscope component to make up a keyscope component set (also referred to herein as a group-based communication keyscope component set).

In embodiments, a group-based communication keyscope component is one of a group-based communication organization identifier 802A, a group-based communication workspace identifier 802B, a group-based communication channel identifier 802C, or a timestamp 802D. In embodiments, each group-based communication message or file is associated with a unique group-based communication message or file keyscope component set. In embodiments, the timestamp identifies a network time at which the group-based communication message or file was electronically transmitted by a client device to the group-based communication server.

In embodiments, the group-based communication encryption request data structure 800 further comprises a key family identifier 804.

In embodiments, the group-based communication organization identifier identifies a group-based communication organization with which a group-based communication message sender (or file creator) identifier is associated, the group-based communication message sender (or file creator) identifier associated with the group-based communication message (or file). In embodiments, the group-based communication workspace identifier identifies a group-based communication workspace with which the group-based communication message sender identifier (or file creator) and group-based communication message (or file) are associated, the group-based communication channel identifier identifies a group-based communication channel with which the group-based communication message sender identifier (or file creator) and group-based communication message (or file) are associated.

In embodiments, an exemplary group-based communication decryption (e.g., message decrypt or file decrypt) request data structure 810 comprises a group-based communication key family identifier 812, encryption key ciphertext 816, and group-based communication message or file ciphertext 818. In embodiments, the exemplary group-based communication decryption request data structure 810 comprises a group-based communication keyscope component set.

FIG. 9 illustrates an exemplary group-based communication keyscope component data structure for use with embodiments of the present disclosure.

In embodiments, a group-based communication keyscope component data structure 900 comprises a group-based communication keyscope component set for a particular group-based communication message. The group-based communication keyscope component set may comprise one to N keyscope components (902A, 902B, 902C, 902D, . . . , 902N).

FIGS. 10A, 10B, and 10C illustrate an exemplary data flow for providing encryption key management within a group-based communication system, according to one embodiment of the present disclosure.

In embodiments, an exemplary routine 1000 begins with receiving 1002, from a group-based communication server, an encrypt request. In embodiments, the encrypt request comprises an encryption key request data structure and encrypt request plaintext. In embodiments, the encrypt request is received by an encryption key management system or a group-based communication encryption key management system.

In embodiments, routine 1000 continues with retrieving 1004, from at least one local memory, an encryption key associated with the encryption key request data structure. In embodiments, the encryption key is retrieved by an encryption key management system or a group-based communication encryption key management system.

In embodiments, routine 1000 continues with encrypting 1006 the encrypt request plaintext using the encryption key to produce encrypt request ciphertext. In embodiments, the encrypting is performed by a group-based communication encryption key management system.

In embodiments, routine 1000 continues with transmitting 1008, to the group-based communication server, the encrypt request ciphertext, at least part of the encryption key request data structure, and encryption key ciphertext based on the encryption key. In embodiments, the transmitting is performed by a group-based communication encryption key management system.

In embodiments, routine 1000 includes, upon determining 1010 that an encryption key associated with the encryption key request data structure is not stored in the at least one local memory, transmitting 1012 an encryption key generation request to a key material source. In embodiments, the encryption key generation request comprising the encryption key request data structure. In embodiments, the determining and transmitting are performed by an encryption key management system or a group-based communication encryption key management system.

In embodiments, routine 1000 includes receiving 1014, from the key material source, the encryption key and encryption key ciphertext associated with the encryption key. In embodiments, the receiving is performed by an encryption key management system or a group-based communication encryption key management system.

In embodiments, routine 1000 includes storing 1016 the encryption key and encryption key ciphertext associated with the encryption key in the at least one local memory. In embodiments, the encryption key and encryption key ciphertext are stored in a local memory of an encryption key management system or a group-based communication encryption key management system.

It will be appreciated that operations 1010, 1012, 1014, and 1016 are performed when it is determined that the encryption key is not stored in the local memory.

In embodiments, routine 1000 further comprises, upon determining 1018 that the key material source has not responded with one or more of the encryption key and encryption key ciphertext, transmitting 1020 an encrypt request error to the group-based communication server.

In embodiments, the encryption key request data structure comprises a plurality of unique keyscope components.

In embodiments, access to encryption keys associated with one or more of the unique keyscope components is revoked.

In embodiments, routine 1000 further comprises receiving 1022, from a group-based communication server, a decrypt request. In embodiments, the decrypt request comprises an encryption key request data structure, encryption key ciphertext, and decrypt request ciphertext. In embodiments, the receiving is performed by an encryption key management system or a group-based communication encryption key management system.

In embodiments, routine 1000 further comprises retrieving 1024, from at least one local memory, an encryption key associated with the encryption key ciphertext. In embodiments, the retrieving is performed by an encryption key management system or a group-based communication encryption key management system.

In embodiments, routine 1000 further comprises decrypting 1026 the decrypt request ciphertext using the encryption key to produce decrypt request plaintext. In embodiments, the decrypting is performed by an encryption key management system or a group-based communication encryption key management system.

In embodiments, routine 1000 further comprises transmitting 1028, to the group-based communication server, the decrypt request plaintext. In embodiments, the transmitting is performed by an encryption key management system or a group-based communication encryption key management system.

In embodiments, routine 1000 further comprises upon determining 1030 that an encryption key associated with the encryption key ciphertext is not stored in the at least one local memory, transmitting 1032 an encryption key generation request to a key material source. In embodiments, the encryption key generation request comprises the encryption key request data structure and the encryption key ciphertext. In embodiments, the transmitting is performed by an encryption key management system or a group-based communication encryption key management system.

In embodiments, routine 1000 further comprises receiving 1034, from the key material source, the encryption key. In embodiments, the receiving is performed by an encryption key management system or a group-based communication encryption key management system.

In embodiments, routine 1000 further comprises storing 1036 the encryption key and encryption key ciphertext associated with the encryption key in the at least one local memory. In embodiments, the storing is performed by an encryption key management system or a group-based communication encryption key management system.

In embodiments, routine 1000 further comprises, upon determining 1038 that the key material source has not responded with the encryption key, transmitting 1040 a decrypt request error to the group-based communication server. In embodiments, the transmitting is performed by an encryption key management system or a group-based communication encryption key management system.

In embodiments, the encryption key request data structure comprises a plurality of unique keyscope components.

In embodiments, access to encryption keys associated with one or more of the unique keyscope components is revoked.

In embodiments, the group-based communication server transmits to a client device channel history placeholder text for rendering within a group-based communication channel interface in a client device display.

In embodiments, the encrypt request plaintext comprises one of group-based communication message plaintext, group-based communication file plaintext or a group-based communication search index encryption key.

In embodiments, the decrypt request ciphertext comprises one of group-based communication message ciphertext or group-based communication file ciphertext.

In embodiments, the decrypt request ciphertext comprises an encrypted group-based communication search index encryption key.

In embodiments, the decrypt request ciphertext comprises an encrypted group-based communication search index encryption key and the group-based communication server transmits to a client device search results omitting a search result associated with the decrypt request ciphertext.

FIGS. 11A and 11B illustrate an exemplary data flow for providing encryption key management, according to embodiments of the present disclosure.

In embodiments, a routine 1100 comprises providing 1102 to one or more servers of a communication system, access to one or more encryption keys provided by a key material source, the encryption keys for accessing data managed by the communication system. In embodiments, the access is provided by an encryption key management system or a group-based communication encryption key management system.

In embodiments, access to encryption keys is revocable on a per keyscope component basis. In embodiments, a keyscope component is associated with an encryption key and is one of a timestamp, a user identifier, a message identifier, a file identifier, group-based communication channel identifier, a group-based communication team identifier, a group-based communication workspace identifier.

In embodiments, routine 1100 further comprises providing 1104, to the one or more servers, access to one or more encryption keys stored in at least one local memory, the encryption keys for accessing data managed by the communication system. In embodiments, the access is provided by an encryption key management system or a group-based communication encryption key management system.

In embodiments, routine 1100 further comprises providing 1106 encrypted plaintext or decrypted ciphertext to the one or more servers, using the one or more encryption keys provided by the key material source. In embodiments, the encrypted plaintext or decrypted ciphertext is provided by an encryption key management system or a group-based communication encryption key management system.

In embodiments, the plaintext comprises one or more of group-based communication message plaintext, group-based communication file plaintext, or a group-based communication search index encryption key.

In embodiments, the ciphertext comprises one or more of group-based communication message ciphertext, group-based communication file ciphertext, or an encrypted group-based communication search index encryption key.

Additional Implementation Details

Implementations of the subject matter and the functional operations described herein can be implemented in various types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for providing encryption key management, the system comprising an encryption key management apparatus communicatively coupled with one or more servers, the one or more servers comprising at least one processor and at least one non-transitory memory storing instructions that, when executed by the processor, configure the one or more servers to:
  receive access to one or more encryption keys provided by a key material source, the one or more encryption keys for accessing data managed by the one or more servers, wherein access to the one or more encryption keys is revocable on a per keyscope component basis such that any encryption key associated with a revoked keyscope component is rendered invalid by the key material source;

receive encrypted plaintext or decrypted ciphertext, wherein the encrypted plaintext is encrypted using the one or more encryption keys provided by the key material source, and further wherein the encrypted plaintext comprises one or more of a message plaintext, a file plaintext, or a search index encryption key; and rotate at least one encryption key of the one or more encryption keys, based at least in part on a timestamp associated with the at least one encryption key.

2. The system of claim 1, wherein the at least one non-transitory memory stores instructions that, when executed by the at least one processor, further configure the one or more servers to:

receive, at the one or more servers and from the encryption key management apparatus, access to one or more encryption keys stored in at least one memory of the encryption key management apparatus, the encryption keys for accessing data managed by the one or more servers.

3. The system of claim 1, wherein the decrypted ciphertext comprises one or more of a decrypted message ciphertext, a decrypted file ciphertext, or a decrypted search index encryption key.

4. The system of claim 1, wherein a keyscope component is associated with an encryption key and is one or more of a timestamp, a user identifier, a message identifier, a file identifier, a channel identifier, a team identifier, organization identifier, key family identifier, location identifier or a workspace identifier.

5. A computer-implemented method for providing encryption key management, comprising:

receiving, by one or more servers, access to one or more encryption keys provided by a key material source, the encryption keys for accessing data managed by the one or more servers, wherein access to the one or more encryption keys is revocable on a per keyscope component basis such that any encryption key associated with a revoked keyscope component is rendered invalid by the key material source;

receiving, by the one or more servers, encrypted plaintext or decrypted ciphertext, wherein the encrypted plaintext is encrypted using the one or more encryption keys provided by the key material source, and further wherein the encrypted plaintext comprises one or more of a message plaintext, a file plaintext, or a search index encryption key; and rotating at least one encryption key of the one or more encryption keys, based at least in part on a timestamp associated with the at least one encryption key.

6. The computer-implemented method of claim 5, further comprising:

receiving by the one or more servers, access to one or more encryption keys stored in at least one memory of an encryption key management apparatus, the encryption keys for accessing data managed by the one or more servers.

7. The computer-implemented method of claim 5, wherein the decrypted ciphertext comprises one or more of a decrypted message ciphertext, a decrypted file ciphertext, or a decrypted search index encryption key.

8. The computer-implemented method of claim 5, wherein a keyscope component is associated with an encryption key and is one or more of a timestamp, a user identifier, a message identifier, a file identifier, a channel identifier, a team identifier, or a workspace identifier.

9. The system of claim 1, wherein the at least one non-transitory memory stores instructions that, when executed by the at least one processor, further configure the one or more servers to:

receive, from the key material source, a request to revoke access to data associated with a particular group-based communication channel.

10. The system of claim 1, wherein the at least one non-transitory memory stores instructions that, when executed by the at least one processor, further configure the one or more servers to:

refresh one or more of a local cache storing encryption keys and a local memory storing the encryption keys.

11. The computer-implemented method of claim 5, further comprising:

retrieving log data associated with access to data owned by the key material source, a particular instance of the log data indicating an access reason associated with accessing the data owned by the key material source.

12. The computer-implemented method of claim 5, further comprising:

revoking access to data associated with the revoked keyscope component while maintaining access to other data owned by the key material source.

13. A non-transitory computer storage medium comprising instructions, the instructions being configured to cause one or more processors to at least perform operations comprising:

receiving, by one or more servers, access to one or more encryption keys provided by a key material source, the encryption keys for accessing data managed by the one or more servers, wherein access to the one or more encryption keys is revocable on a per keyscope component basis such that any encryption key associated with a revoked keyscope component is rendered invalid by the key material source;

receiving, by the one or more servers, encrypted plaintext or decrypted ciphertext, wherein the encrypted plaintext is encrypted using the one or more encryption keys provided by the key material source, and further wherein the encrypted plaintext comprises one or more of a message plaintext, a file plaintext, or a search index encryption key; and rotating at least one encryption key of the one or more encryption keys, based at least in part on a timestamp associated with the at least one encryption key.

14. The non-transitory computer storage medium of claim 13, the instructions being configured to cause the one or more processors to perform operations further comprising:

revoking access to data associated with the revoked keyscope component while maintaining access to other data owned by the key material source.

15. The non-transitory computer storage medium of claim 13, the instructions being configured to cause the one or more processors to perform operations further comprising:

receiving, by the one or more servers, access to one or more encryption keys stored in at least one memory of an encryption key management apparatus, the encryption keys for accessing data managed by the one or more servers.

16. The non-transitory computer storage medium of claim 13, wherein the decrypted ciphertext comprises one or more of a decrypted message ciphertext, a decrypted file ciphertext, or a decrypted search index encryption key.

17. The non-transitory computer storage medium of claim 13, wherein a keyscope component is associated with an encryption key and is one or more of a timestamp, a user identifier, a message identifier, a file identifier, a channel identifier, a team identifier, or a workspace identifier.

18. The non-transitory computer storage medium of claim 13, the instructions being configured to cause the one or more processors to perform operations further comprising:
   receiving, from the key material source, a request to revoke access to data associated with a particular group-based communication channel.

19. The system of claim 1, wherein the one or more encryption keys comprise an encryption key family, and further wherein rotating the at least one encryption key comprises rotating the encryption key family.

20. The non-transitory computer storage medium of claim 13, wherein the one or more encryption keys comprise an encryption key family, and further wherein rotating the at least one encryption key comprises rotating the encryption key family.

\* \* \* \* \*